(12) United States Patent
Kobayashi et al.

(10) Patent No.: US 11,338,706 B2
(45) Date of Patent: May 24, 2022

(54) VEHICLE CABIN CONTROL DEVICE

(71) Applicant: Toyota Jidosha Kabushiki Kaisha, Toyota (JP)

(72) Inventors: Hideki Kobayashi, Miyoshi (JP); Mikihiro Amano, Toyota (JP); Kihiro Kato, Tokoname (JP); Hiroshi Mizobata, Seto (JP); Kazuhiro Matsui, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 16/715,290

(22) Filed: Dec. 16, 2019

(65) Prior Publication Data
US 2020/0223328 A1 Jul. 16, 2020

(30) Foreign Application Priority Data
Jan. 16, 2019 (JP) .............................. JP2019-005515

(51) Int. Cl.
*B60N 2/02* (2006.01)
*B60N 2/14* (2006.01)
*B60N 2/01* (2006.01)

(52) U.S. Cl.
CPC ................. *B60N 2/14* (2013.01); *B60N 2/01* (2013.01); *B60N 2/0244* (2013.01); *B60N 2002/0268* (2013.01); *B60N 2002/0272* (2013.01)

(58) Field of Classification Search
CPC ...... B60N 2/0292; B60N 2/0244; B60N 2/01; B60N 2/14; B60N 2002/022; G05D 1/0088; B60W 2540/041; B60W 2540/049; B60W 2556/65; B60W 40/08; H04W 4/48; B60R 16/037
See application file for complete search history.

(56) References Cited

U.S. PATENT DOCUMENTS

| 4,802,706 A * | 2/1989 | Onimaru .............. B60N 2/0224 296/68 |
| 7,934,763 B2 * | 5/2011 | Mabuchi .................. B60N 2/01 296/65.07 |

(Continued)

FOREIGN PATENT DOCUMENTS

| JP | 2009-149262 A | 7/2009 |
| JP | 2009-149263 A | 7/2009 |

(Continued)

*Primary Examiner* — Syed A Islam
(74) *Attorney, Agent, or Firm* — Dinsmore & Shohl LLP

(57) ABSTRACT

A vehicle cabin control device includes: a plurality of seating surface changing devices; a determination unit; and an output unit. The seating surface changing devices is configured to change orientations of seating surfaces of a plurality of vehicle seats. When the determination unit determines that the sharing state is desirable, the output unit operates the seating surface changing devices so as to change orientations of bodies of the occupants to such orientations that the occupants easily communicate with each other. When the determination unit determines that the sharing state is not desirable, the output unit operates the seating surface changing device so as to change an orientation of the body of the occupant to such an orientation that the occupant does not easily communicates with the other occupants.

15 Claims, 18 Drawing Sheets

(56) References Cited

U.S. PATENT DOCUMENTS

| | | | |
|---|---|---|---|
| 9,862,290 B2 * | 1/2018 | Yamada | B60N 2/0224 |
| 10,220,755 B2 * | 3/2019 | Shibata | B60N 2/665 |
| 10,486,553 B2 * | 11/2019 | Hirayama | B60N 2/767 |
| 10,500,988 B1 * | 12/2019 | Faruque | B60N 2/146 |
| 10,572,123 B2 | 2/2020 | Penilla | H04L 63/104 |
| 10,667,104 B2 * | 5/2020 | Baek | H04W 4/40 |
| 10,933,839 B2 * | 3/2021 | Jaradi | B60R 22/24 |
| 10,960,839 B2 * | 3/2021 | Imura | B60N 2/14 |
| 2009/0160229 A1 | 6/2009 | Mabuchi et al. | |
| 2015/0078632 A1 * | 3/2015 | Hachisuka | G06K 9/00832 |
| | | | 382/118 |
| 2016/0152166 A1 | 6/2016 | Lorenz et al. | |
| 2018/0105067 A1 | 4/2018 | Ajisaka | |
| 2018/0194194 A1 | 7/2018 | Lyubich et al. | |
| 2018/0222414 A1 * | 8/2018 | Ihlenburg | B60R 16/037 |
| 2018/0226077 A1 * | 8/2018 | Choi | B60K 35/00 |
| 2018/0229638 A1 | 8/2018 | Minato et al. | |
| 2020/0037757 A1 * | 2/2020 | Onoyama | B60N 2/01 |
| 2020/0086764 A1 * | 3/2020 | Mimura | B60N 2/01 |
| 2020/0148076 A1 * | 5/2020 | Main | B60N 2/0244 |
| 2020/0171979 A1 * | 6/2020 | Yetukuri | B60N 2/002 |
| 2020/0223328 A1 * | 7/2020 | Kobayashi | B60N 2/0244 |

FOREIGN PATENT DOCUMENTS

| | | | | |
|---|---|---|---|---|
| JP | 2013-163402 A | 8/2013 | | |
| JP | 2016-097780 A | 5/2016 | | |
| JP | 2017-081463 A | 5/2017 | | |
| JP | 2018-062277 A | 4/2018 | | |
| JP | 2018-095208 A | 6/2018 | | |
| WO | 2009083773 A1 | 7/2009 | | |
| WO | 2017075386 A1 | 5/2017 | | |
| WO | WO-2017075386 A1 * | 5/2017 | | H04W 4/023 |
| WO | 2018116461 A1 | 6/2018 | | |

* cited by examiner

VEHICLE CABIN CONTROL DEVICE

CROSS-REFERENCE TO RELATED APPLICATIONS

This application claims priority to Japanese Patent Application No. 2019-005515 filed on Jan. 16, 2019, which is incorporated herein by reference in its entirety including the specification, drawings and abstract.

BACKGROUND

1. Technical Field

The disclosure relates to a vehicle cabin control device.

2. Description of Related Art

Japanese Patent Application Publication No. 2016-97780 discloses a disclosure relating to a swivel seat device. The swivel seat device can swivel one of a plurality of vehicle seats located next to each other in the lateral direction of a vehicle inward in the lateral direction of the vehicle with respect to the other vehicle seat. The distance the occupants sitting on the vehicle feel can thus be adjusted.

SUMMARY

In the configuration disclosed in the above related art document, the one vehicle seat is swiveled inward in the lateral direction of the vehicle. A vehicle cabin thus becomes a space desirable for situations where a plurality of occupants communicate with each other. However, there is room for improvement in terms of handling situations where occupants want to spend time in a private space. Since the atmosphere in the vehicle cabin with occupants sitting on the vehicle seats varies depending on the situation, it is desirable to create the space in the vehicle cabin in accordance with the atmosphere. The above related art has room for improvement in these respects.

The disclosure provides a vehicle cabin control device that can make occupants feel more comfortable in a vehicle cabin.

A vehicle cabin control device according to a first aspect of the disclosure includes: a plurality of seating surface charging devices configured to change orientations of seating surfaces of a plurality of vehicle seats mounted in a vehicle cabin a detection unit configured to detect states of a plurality of occupants sitting on the vehicle seats; a determination unit configured to determine whether a sharing state is desirable based on a detection result of the detection unit, the sharing state being a state in which the occupants easily communicate with each other; and an output unit configured to when the determination unit determines that the sharing state is desirable, operate the seating surface changing devices corresponding to the vehicle seats where first occupants are seated so as to change orientations of bodies of the first occupants to such orientations that the first occupants easily communicate with each other, the first occupants being occupants for whom the sharing state is desirable, and when the determination unit determines that the sharing state is not desirable, operate the seating surface changing device corresponding to the vehicle seat where a second occupant is seated so as to change an orientation of the body of the second occupant to such an orientation that the second occupant does not easily communicate with the other occupants, the second occupant being an occupant for whom the sharing state is not desirable.

According to the above aspect, the vehicle cabin control device includes the seating surface changing devices, the detection unit, the determination unit, and the output unit. The seating surface changing devices can individually change the orientations of the seating surfaces of the vehicle seats mounted in the vehicle cabin. The orientations of the bodies of the occupants sitting on the vehicle seats can thus be changed. The detection unit detects the states of the occupants sitting on the vehicle seats. The determination unit determines whether the sharing state in which the occupants can easily communicate with each other is desirable based on the detection result of the detection unit. When the determination unit determines that the sharing state is desirable, the output unit operates the seating surface changing devices to change the orientations of bodies of the occupants for which the determination unit determines that the sharing state is desirable to such orientations that make it easy for the occupants to communicate with each other. This facilitates active communication between the occupants for which the determination unit determines that the sharing state is desirable.

When the determination unit determines that the sharing state is not desirable, the output unit operates the seating surface changing devices to change the orientations of the bodies of the occupants for which the determination unit determines that the sharing state is not desirable to such orientations that make it difficult for each of the occupants to communicate with the other occupants. The occupants for which the determination unit determines that the sharing state is not desirable can thus easily have private time. That is, by detecting the states of the occupants, an appropriate space can be created in the vehicle cabin in accordance with the atmosphere in the vehicle cabin at the time.

As used herein, the "seating surface" includes at least one of a surface that can contact the buttocks of an occupant in a seat cushion that forms a vehicle seat and supports the buttocks of the occupant and a surface that can contact the back of an occupant in a seatback that forms a vehicle seat and supports the back of the occupant.

With the above configuration, the occupants feel more comfortable in the vehicle cabin.

In the vehicle cabin control unit of the first aspect, the seating surface changing devices may include a swivel mechanism configured to swivel the vehicle seat about a vertical direction of a vehicle.

With the above configuration, each of the seating surface changing devices includes the swivel mechanism that swivels the vehicle seat substantially about the vertical direction of the vehicle. Accordingly, the orientation of the bodies of the occupants sitting on the vehicle seats can be easily changed by operating the swivel mechanisms so as to swivel the vehicle seats substantially in the horizontal direction.

With the above configuration, the orientations of the bodies of the occupants sitting on the vehicle seats can be more reliably changed.

In the vehicle cabin control device of the first aspect, each of the seating surface changing devices may include a variable seating surface mechanism configured to change the shape of the seating surface of the vehicle seat.

With the above configuration, each of the seating surface changing devices include the variable seating surface mechanism that changes the shape of the seating surface of the vehicle seat. Accordingly, the orientations of the bodies of the occupants can be changed by operating the variable seating surface mechanisms so as to change the orientations of the bodies of the occupants sitting on the vehicle seats.

With the above configuration, the orientations of the bodies of the occupants can be changed even when there is not enough space in the vehicle cabin.

In the vehicle cabin control device of the first aspect, the output unit may be configured to operate the seating surface changing devices so that the bodies of all the occupants face inward in the vehicle cabin, when the determination unit determines that the sharing state is desirable for all of the occupants.

With the above configuration, when the determination unit determines that the sharing state is desirable for all of the occupants, the output unit operates the seating surface changing devices so that the bodies of all the occupants face each other. The occupants thus easily come into sight of each other, which facilitates active communication between the occupants.

With the above configuration, the occupants feel more comfortable in situations where the occupants want to communicate with each other.

In the vehicle cabin control device of the first aspect, the output unit may be configured to, when the determination unit determines that the sharing state is desirable for specific occupants among the occupants, operate the seating surface changing devices corresponding to the vehicle seats where the specific occupants are seated so that the bodies of the specific occupants face inward in the vehicle cabin.

With the above configuration, when the determination unit determines that the sharing state in which specific ones of the occupants can easily communicate with each other, the output unit operates the seating surface changing devices so that the bodies of the specific occupants face each other. That is, the specific occupants easily come into sight of each other, which makes it easy for the specific occupants to communicate with each other. An appropriate space can thus be created in the vehicle cabin in accordance with the individual situations of the occupants riding in the vehicle.

With the above configuration, in the case where the occupants in various states are riding in the vehicle, the occupants feel more comfortable in the vehicle cabin.

In the vehicle cabin control device of the first aspect, the output unit may be configured to operate the seating surface changing devices so that the bodies of all the occupants face outward in the vehicle cabin, when the determination unit determines that the sharing state is not desirable for any of the occupants.

With the above configuration, when the determination unit determines that the sharing state is not desirable for any of the occupants, the output unit operates the seating surface changing devices so that the bodies of all the occupants face outward in the vehicle cabin. The occupants are therefore less likely to come into sight of each other, so that each of the occupants can more easily have private time.

With the above configuration, the occupants feel more comfortable in situations where the occupants do not communicate with each other.

In the vehicle cabin control device of the first aspect, the output unit may be configured to, when the determination unit determines that the sharing state is not desirable for a specific occupant among the occupants, operate the seating surface changing device corresponding to the vehicle seat where the specific occupant is seated so that the body of the specific occupant faces outward in the vehicle cabin.

With the above configuration, when the determination unit determines that the sharing state is not desirable for a specific one of the occupants, the output unit operates a corresponding one of the seating surface changing devices so that the body of the specific occupant faces outward in the vehicle cabin. The other occupants are thus less likely to come into sight of the specific occupant, so that the specific occupant can easily have private time. An appropriate space can thus be created in the vehicle cabin in accordance with the individual situations of the occupants riding in the vehicle.

With the above configuration, in the case where the occupants in various states are riding in the vehicle, the occupants feel more comfortable in the vehicle cabin.

In the vehicle cabin control device of the above aspect, a plurality of switches configured to be operated by the occupants sitting on the vehicle seats may be mounted in the vehicle cabin, the detection unit may be configured to detect an operating state of at least one of the switches, and the determination unit may be configured to determine whether the sharing state is desirable in accordance with the detection result of the detection unit.

With the above configuration, the detection unit detects the operating state of at least one of the switches that are mounted in the vehicle cabin and that can be operated by the occupants sitting on the vehicle seats may be mounted in the vehicle cabin, and the determination unit determines whether the sharing state is desirable in accordance with the detection result of the detection unit. An appropriate space can thus be created in the vehicle cabin according to the intention of each occupant who operates the operation switch.

With the above configuration, the occupants feel more comfortable in the vehicle cabin.

In the vehicle cabin control device of the first aspect, the detection unit may be configured to detect speech of at least one of the occupants, and the determination unit may be configured to determine that the sharing state is desirable when the detection unit detects the speech.

With the above configuration, the determination unit determines that the sharing state is desirable when the detection unit detects speech of at least one of the occupants. Based on this determination, the output unit operates the seating surface changing devices so that the bodies of the occupants faces inward in the vehicle cabin. This facilitates conversation between the occupants and thus facilitate more active communication between the occupants.

With the above configuration, the occupants feel more comfortable in situations where the occupants want to communicate with each other.

In the vehicle cabin control device of the first aspect, the detection unit may be configured to detect states of mobile devices of at least two of the occupants, and the determination unit may be configured to determine that the sharing state is desirable when information is shared between the mobile devices.

With the above configuration, the detection unit detects the states of the mobile devices of at least two of the occupants, and the determination unit determines that the sharing state is desirable when information is shared between the mobile devices. That is, since the determination unit determines whether the sharing state is desirable based on whether information is shared between the mobile devices, namely between those occupants who are likely to communicate with each other, a more appropriate space can be created in the vehicle cabin.

As used herein, "when information is shared between the or among the mobile devices" includes the state in which content etc. is sent from the mobile device of one occupant to the mobile device of the other occupant and the state in which substantially the same information is displayed on both the mobile device of one occupant and the mobile device of the other occupant.

With the above configuration, the occupants feel more comfortable in situations where the occupants want to communicate with each other.

In the vehicle cabin control device of the first aspect, at least one display device may be mounted in the vehicle cabin, the output unit may be configured to when the determination unit determines that the sharing state is desirable, display information on the one display device and operate the seating surface changing devices so that the bodies of the occupants face the display device on which information is displayed.

With the above configuration, at least one display device is mounted in the vehicle cabin. When the determination unit determines that the sharing state is desirable, the output unit displays information on the one display device and also operates the seating surface changing devices so that the bodies of the occupants face the display device on which information is displayed. That is, when the sharing state is desirable, the occupants can easily look at the one display device on which information is displayed. Accordingly, the one display device serves as what is called a focal point, so that the occupants can more actively communicate with each other and feel closer to each other.

With the above configuration, the occupants feel more comfortable in situations where the occupants want to communicate with each other.

In the vehicle cabin control device of the above aspect, the detection unit may be configured to detect states of mobile devices of at least two of the occupants. The determination unit may be configured to determine that the sharing state is desirable when information is shared between the mobile devices. At least one display device may be mounted in the vehicle cabin. When the determination unit determines that the sharing state is desirable, the output unit may display information on the one display device and operate the seating surface changing devices so that the bodies of the occupants face the display device on which information is displayed. When the determination unit determines that information is shared between the mobile devices, the output unit may display on the display device substantially the same information as the information displayed on the mobile devices sharing the information.

With the above configuration, when the determination unit determines that information is shared between the mobile devices, the output unit displays on the display device substantially the same information as the information displayed on the mobile devices sharing the information. The occupants thus tend to look at the display device, so that the occupants are more likely to feel closer to each other.

With the above configuration, the occupants feel more comfortable in the vehicle cabin in situations where the occupants want to communicate with each other.

In the vehicle cabin control device of the above aspect, the detection unit may be configured to detect states of mobile devices of at least two of the occupants. The determination unit may be configured to determine whether information is shared between the mobile devices. At least one display device may be mounted in the vehicle cabin. The output unit may be configured to, when the determination unit determines that information is shared between the mobile devices, display on the display device the same information as the information displayed on the mobile devices sharing the information.

With the above configuration, the occupants feel more comfortable in the vehicle cabin in situations where the occupants want to communicate with each other.

In the vehicle cabin control device of the first aspect, the detection unit may be configured to detect facial expressions of the occupants. The determination unit may be configured to estimate emotions of the occupants detected based on the detection result of the detection unit, and determine that the sharing state is desirable when the emotions are a specific emotion.

With the above configuration, the determination unit estimates emotions of the occupants detected from the facial expressions of the occupants detected by the detection unit. The determination unit determines that the sharing state is desirable when the emotions are a specific emotion. This facilitates smooth communication between the occupants based on their emotions.

With the above configuration, the occupants feel more comfortable in the vehicle cabin.

In the vehicle cabin control device of the first aspect, the detection unit may be configured to detect facial expressions of the occupants. The determination unit may be configured to estimate levels of alertness of the occupants detected based on the detection result of the detection unit, and determine that the sharing state is desirable when the levels of alertness are a specific level of alertness.

With the above configuration, the determination unit estimates the levels of alertness of the occupants detected from the facial expressions of the occupants detected by the detection unit. The determination unit determines that the sharing state is desirable when the levels of alertness are a specific level of alertness. The occupants with similar levels of alertness can thus communicate with each other.

With the above configuration, the occupants thus feel more comfortable in the vehicle cabin.

In the vehicle cabin control device of the first aspect, the vehicle seats may be equipped with directional speakers. The directional speakers may be configured to when the determination unit determines that the sharing state is desirable, output same information from the directional speakers of the vehicle seats for which the determination unit determines that the sharing state is desirable, and when the determination unit determines that the sharing state is not desirable, output individual information from the directional speakers of the vehicle seats for which the determination unit determines that the sharing state is not desirable.

With the above configuration, when the determination unit determines that the sharing state is desirable, the same information can be output to the vehicle seats for which the determination unit determines that the sharing state is desirable from corresponding ones of the directional speakers. When the determination unit determines that the sharing state is not desirable, individual information can be output to each of the vehicle seats for which the determination unit determines that the sharing state is not desirable from a corresponding one of the directional speakers. Accordingly, when the sharing state is desirable, the occupants can listen to the same sound and thus, can more smoothly communicate with each other. When the sharing state is not desirable, the occupants can individually listen to sound so that the other occupants cannot or hardly hear the sound. The occupants can therefore more enjoy private time.

With the above configuration, the occupants feel more comfortable in the vehicle cabin.

In the vehicle cabin control device of the first aspect, the vehicle seats may have air outlets connected to a vehicle air conditioning unit. The air outlets may be configured to, when the determination unit determines that the sharing state is not desirable, output individually conditioned air from the air outlets of the vehicle seats for which the determination unit determines that the sharing state is not desirable.

With the above aspect, each of the vehicle seats has the air outlet connected to the vehicle air conditioning unit. When the determination unit determines that the sharing state is not desirable, individually conditioned air can be output to each of the vehicle seats for which the determination unit determines that the sharing state is not desirable from a corresponding one of the air outlets. An air conditioning environment in accordance with the preference of each occupant sitting on the vehicle seat can thus be provided. The occupants can therefore have more comfortable private time.

With the above configuration, the occupants feel more comfortable in the vehicle cabin in situations where the occupants do not need to communicate with each other.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
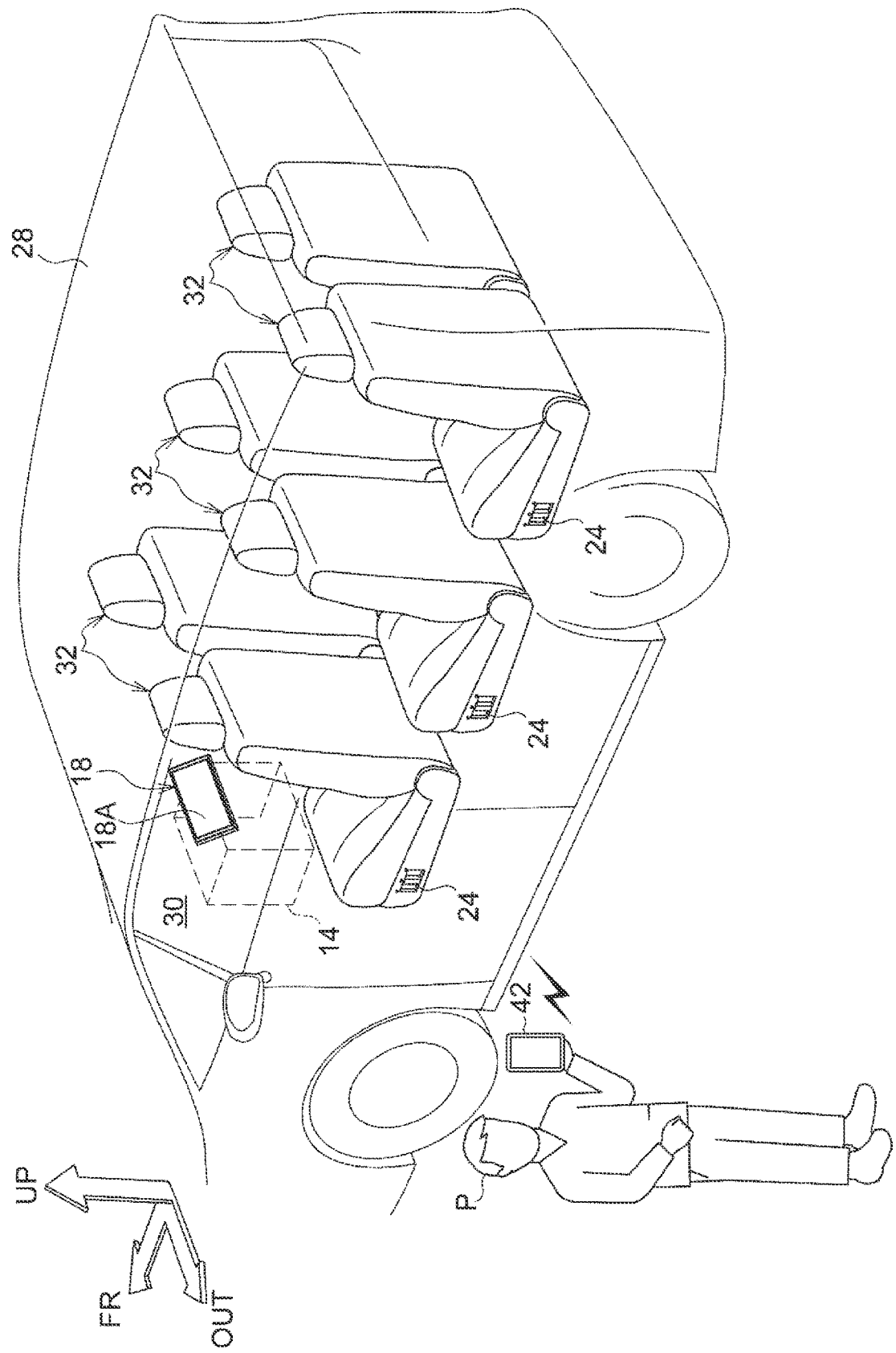
FIG. 1 is a schematic perspective view of a vehicle having a vehicle cabin control device according to a first embodiment as viewed obliquely from behind.

A vehicle cabin control device 10 of the disclosure will be described with reference to FIGS. 1 to 10. Arrows FR, UP, and OUT shown in the figures indicate the forward direction (direction of travel), the upward direction, and outward in the lateral direction of a vehicle. The same or equivalent components and portions are denoted with the same reference characters throughout the figures. The proportions in the figures are exaggerated for convenience and may be different from actual ones.

Hardware Configuration

Figure 2:
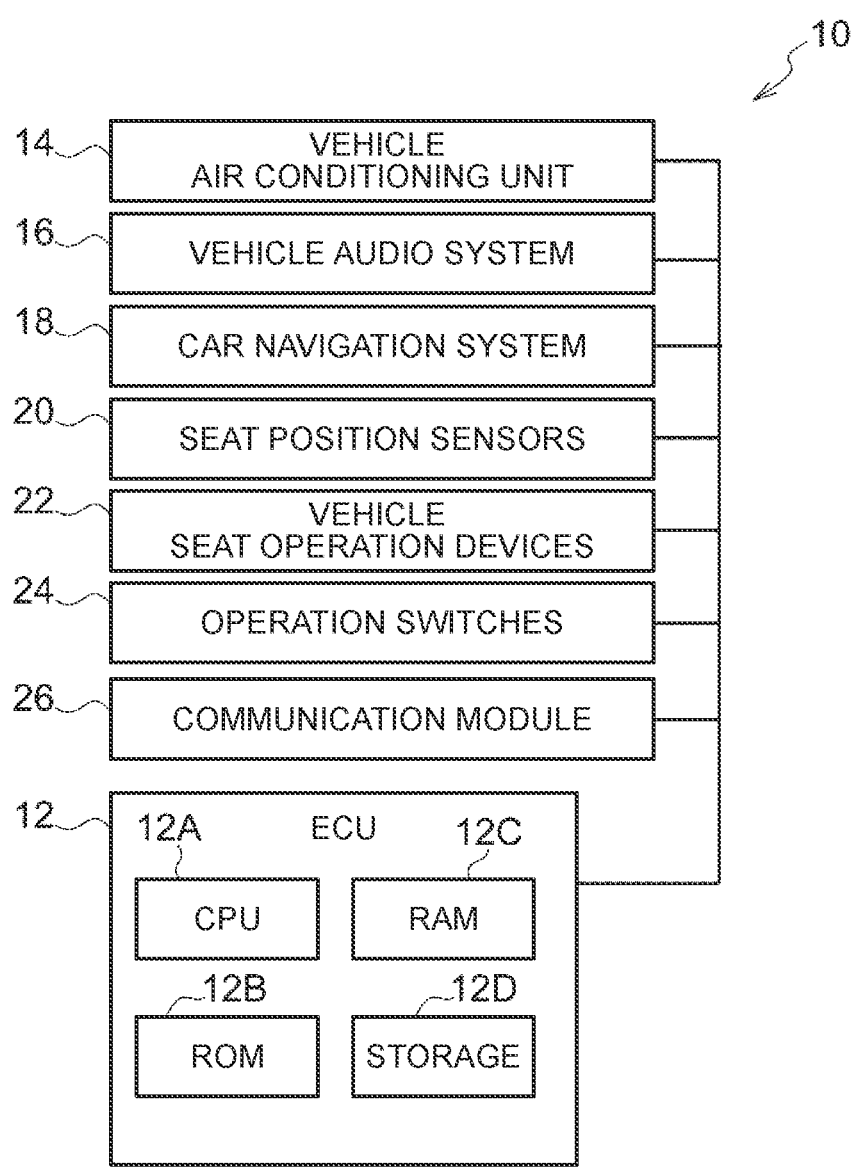
FIG. 2 is a block diagram illustrating a hardware configuration of the vehicle cabin control device according to the first embodiment.

As shown in FIG. 2, the vehicle cabin control device 10 includes an ECU 12, a vehicle air conditioning unit 14, a vehicle audio system 16, a car navigation system 18, seat position sensors 20, vehicle seat operation devices 22 that are the seating surface changing devices, operation switches 24 that are the switches, and a communication module 26. The vehicle cabin control device 10 is mounted in a vehicle cabin 30 of a vehicle 28 shown in FIG. 1. The vehicle 28 is, e.g., a minivan having a plurality of vehicle seats 32 in the vehicle cabin 30. The vehicle seats 32 are arranged in, e.g., three rows, and the vehicle 28 has side doors, not shown, on its both sides so that occupants can get in and out of the vehicle seats 32 in the second and third rows. In the following description, the vehicle seats 32 in the first and second rows will be mainly described and description of the vehicle seats 32 in the third row will be omitted. The vehicle seats 32 in the third row are not shown in the figures other than FIG. 1.

Figure 4:
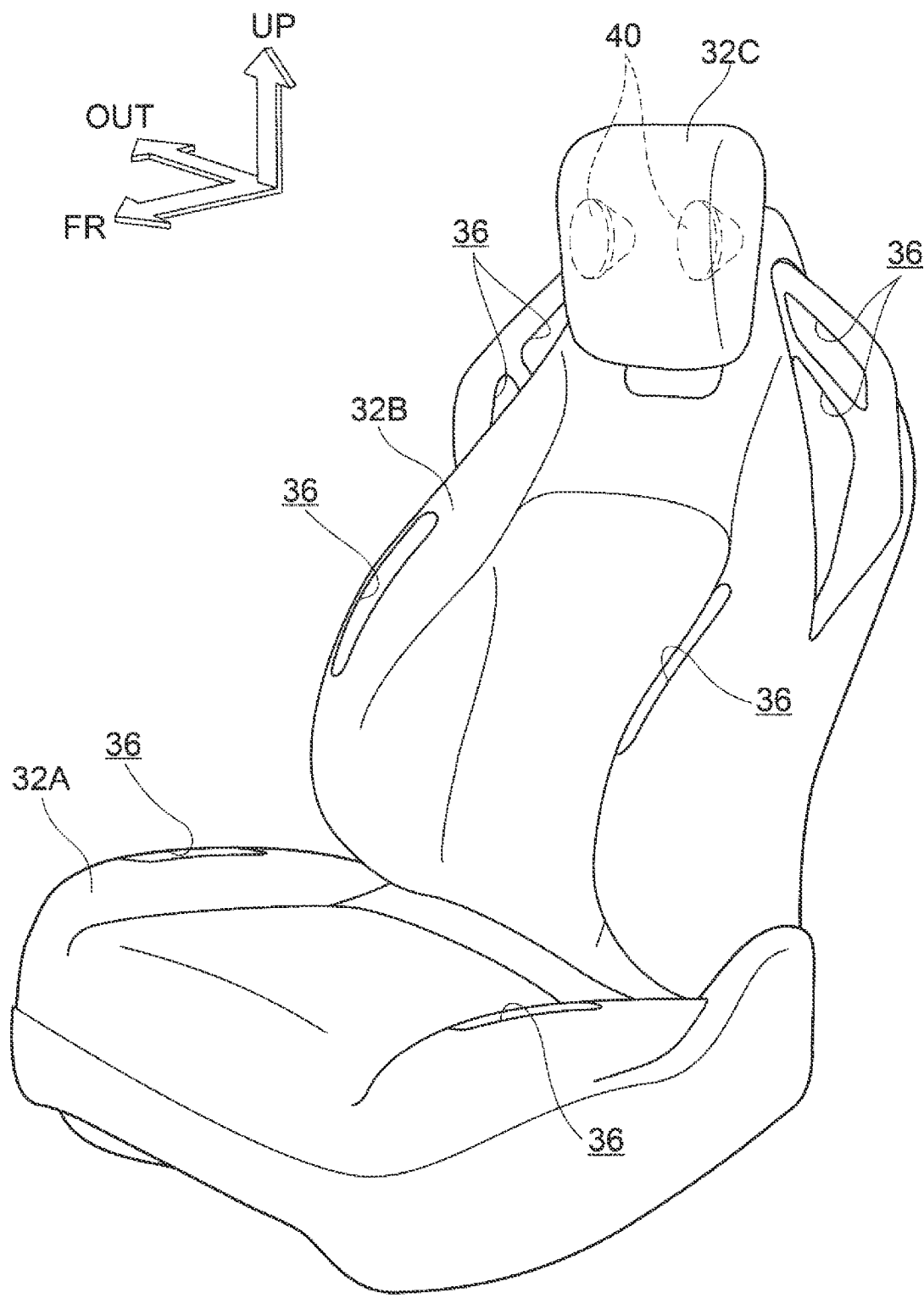
FIG. 4 is a schematic perspective view of a vehicle seat in the vehicle having the vehicle cabin control device according to the first embodiment.
Figure 5:
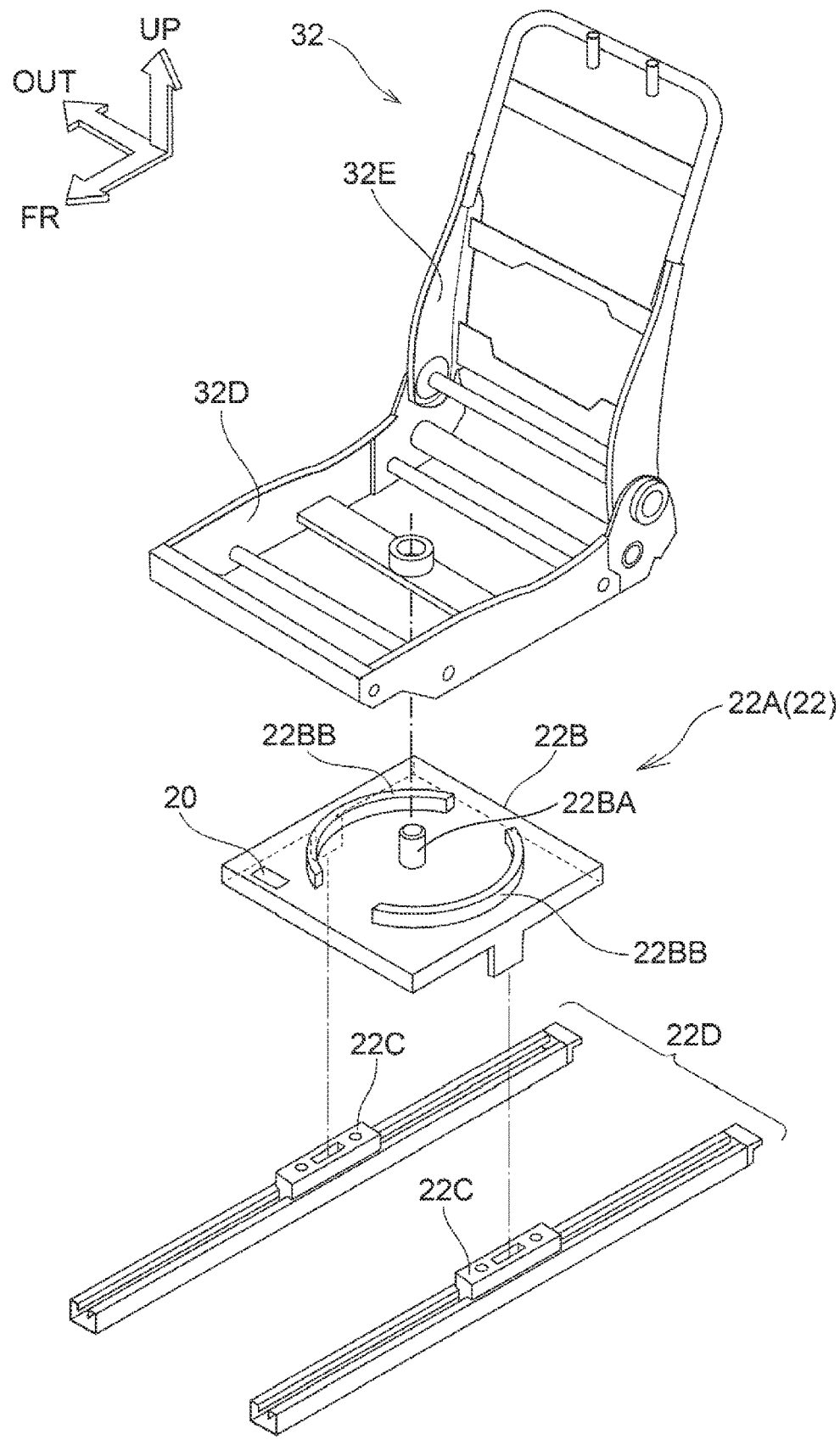
FIG. 5 is an exploded perspective view illustrating inside of the vehicle seat in the vehicle having the vehicle cabin control device according to the first embodiment.

The vehicle seats 32 are mounted on a vehicle floor, not shown, via the vehicle seat operation devices 22 (see FIG. 2). As shown in FIG. 4, each vehicle seat 32 is comprised of a seat cushion 32A, a seatback 32B, and a headrest 32C. The seat cushion 32A supports the lower back and thighs of a seated occupant, the seatback 32B supports the back of the seated occupant, and the headrest 32C supports the head of the seated occupant. As shown in FIG. 5, the seat cushion 32A contains a seat cushion frame 32D as a frame member. Similarly, the seatback 32B contains a seatback frame 32E as a frame member. (Although the vehicle seat 32 of the present embodiment has a design shape shown in FIG. 4, the vehicle seat 32 is shown partially simplified in other figures.)

Each vehicle seat operation device 22 has a swivel mechanism 22A. The swivel mechanism 22A has a swivel unit 22B and a pair of right and left slide rail units 22D. The pair of right and left slide rail units 22D are attached to a part of the vehicle floor which corresponds to the vehicle seat 32 and extend in the longitudinal direction of the vehicle 28. Slide pieces 22C are engaged in the slide rail units 22D such that the slide pieces 22C can move in the longitudinal direction of the vehicle 28 along the slide rail units 22D.

The swivel unit 22B is disposed between the slide pieces 22C and the vehicle seat 32 and includes a shaft portion 22BA, guide rails 22BB, and a drive mechanism (not shown). The shaft portion 22BA has its axis extending in the vertical direction of the vehicle 28. Each guide rail 22BB has an arc shape about the shaft portion 22BA as viewed in plan. The drive mechanism includes an actuator, not shown, and is connected to the ECU 12 (see FIG. 2) so that the drive mechanism and the ECU 12 can communicate with each other. When the drive mechanism is operated, the vehicle seat 32 is guided about the shaft portion 22BA by the guide rails 22BB and is swiveled about the vertical direction of the vehicle 28. The vehicle seat operation device 22 is equipped with the seat position sensor 20 (see also FIG. 2). The seat position sensor 20 can detect the orientation of the vehicle seat 32. The vehicle seat 32 may not only be able to be swiveled by the vehicle seat operation device 22, but also be able to be moved substantially in the longitudinal direction of the vehicle 28 along the slide rail units 22D.

As shown in FIG. 1, each vehicle seat 32 is equipped with the operation switch 24. Each operation switch 24 is connected to the ECU 12 of the vehicle cabin control device 10 so that the operation switch 24 and the ECU 12 can communicate with each other. By operating the operation switch 24, the vehicle seat operation device 22 can be operated to swivel the vehicle seat 32 to a desired orientation. For example, the operation switch 24 can be selectively operated to swivel the vehicle seat 32 inward in the lateral direction of the vehicle 28 (inward in the vehicle cabin 30) or outward in the lateral direction of the vehicle 28 (outward in the vehicle cabin 30). The vehicle seat 32 is set so as to normally (before the vehicle cabin control device 10 performs processing, etc.) face toward the front of the vehicle 28 (hereinafter this state is referred to as the "normal state").

The vehicle air conditioning unit 14 is mounted in the vehicle cabin 30. The vehicle air conditioning unit 14 includes an air conditioning duct, not shown, and air outlets 36 (see FIG. 4). For example, the vehicle air conditioning unit 12 is mounted in front of and below an instrumental panel, not shown, in the longitudinal direction of the vehicle 28. The vehicle air conditioning unit 14 includes a main fan, not shown. An airflow is formed when the main fan is operated. An evaporator, a heater core, etc. (all of which are not shown) are mounted on the downstream side of the airflow with respect to the main fan to adjust the temperature, humidity, etc. of the airflow to provide conditioned air. This airflow flows through the air conditioning duct connected to the vehicle air conditioning unit 14 and is output as conditioned air to the outside from the air outlets 36. The vehicle air conditioning unit 14 is connected to the ECU 12 so that the vehicle air conditioning unit 14 and the ECU 12 can communicate with each other. The vehicle air conditioning unit 14 can output conditioned air with different temperatures and in different volumes from each air outlet 36 in response to commands from the ECU 12.

The car navigation system 18 is mounted in the vehicle cabin 30. The car navigation system 18 includes a car navigation body, not shown, and a display 18A that is the display device. The car navigation body can calculate a route based on map information stored in advance or obtained via communication with the outside and position information of the vehicle 28 measured by a GPS receiving unit, not shown, and can output the route to the display 18A. The car navigation system 18 is connected to the ECU 12 so that the car navigation system 18 and the ECU 12 can communicate with each other. The car navigation system 18 can display information received from the ECU 12 on the display 18A.

As shown in FIG. 4, a directional speaker 40 is mounted in the headrest 37C of the vehicle seat 32. For example, the directional speaker 40 has directivity toward the head of the occupant sitting on this vehicle seat 32. Occupants other than the one sitting on this vehicle seat 32 cannot or hardly hear sound output from the directional speaker 40. The directional speaker 40 is mounted in each vehicle seat 32.

Each directional speaker 40 is connected to the vehicle audio system 16 (see FIG. 2) mounted in the vehicle cabin 30. The vehicle audio system 16 is connected to the ECU 12 so that the vehicle audio system 16 and the ECU 12 can communicate with each other. The vehicle audio system 16 can output information received from the ECU 12 from the directional speakers 40 and speakers 50 (see FIG. 9) mounted in the vehicle cabin 30. The vehicle audio system 16 can output the same or different information from the directional speakers 40.

As shown in FIG. 2, the communication module 26 detects the position and operating state of a mobile device 42 (see FIG. 1) of an occupant P. Specifically, when the communication module 26 has established communication with the mobile device 42 via short-range wireless communication such as Bluetooth (registered trademark), the communication module 26 detects that the mobile device 42 is located in the vehicle cabin 30. When the communication module 26 detects that the mobile device 42 is located in the vehicle cabin 30, the communication module 26 estimates the position of the occupant P having the mobile device 42 from the strength and direction of radio waves used for the detection and detects the operating state of the mobile device 42. The communication module 26 can also receive content from the mobile device 42 and send the content etc. to the car navigation system 18, other mobile devices 42, etc. The occupant P can thus selectively send the content in his or her mobile device 42 to other mobile devices 42 or the car navigation system 18.

The ECU 12 contains a CPU 12A, a ROM 12B, a RAM 12C, and a storage 12D. The CPU 12A is a central processing unit. The CPU 12A executes various programs and controls each unit. That is, the CPU 12A reads a program from the ROM 12B or the storage 12D and executes the program using the RAM 12C as a working area. The CPU 12A controls each of the above configurations and performs various computations according to the program recorded on the ROM 12B or the storage 12D.

The ROM 12B stores various programs and various data. The RAM 12C serves as a working area and tempo and stores a program or data therein. The storage 12D is comprised of an HDD or an SSD and stores various programs including an operating system and various data. In the present embodiment, the ROM 12B or the storage 12D stores a vehicle cabin control program.

Functional Configurations

Figure 3:
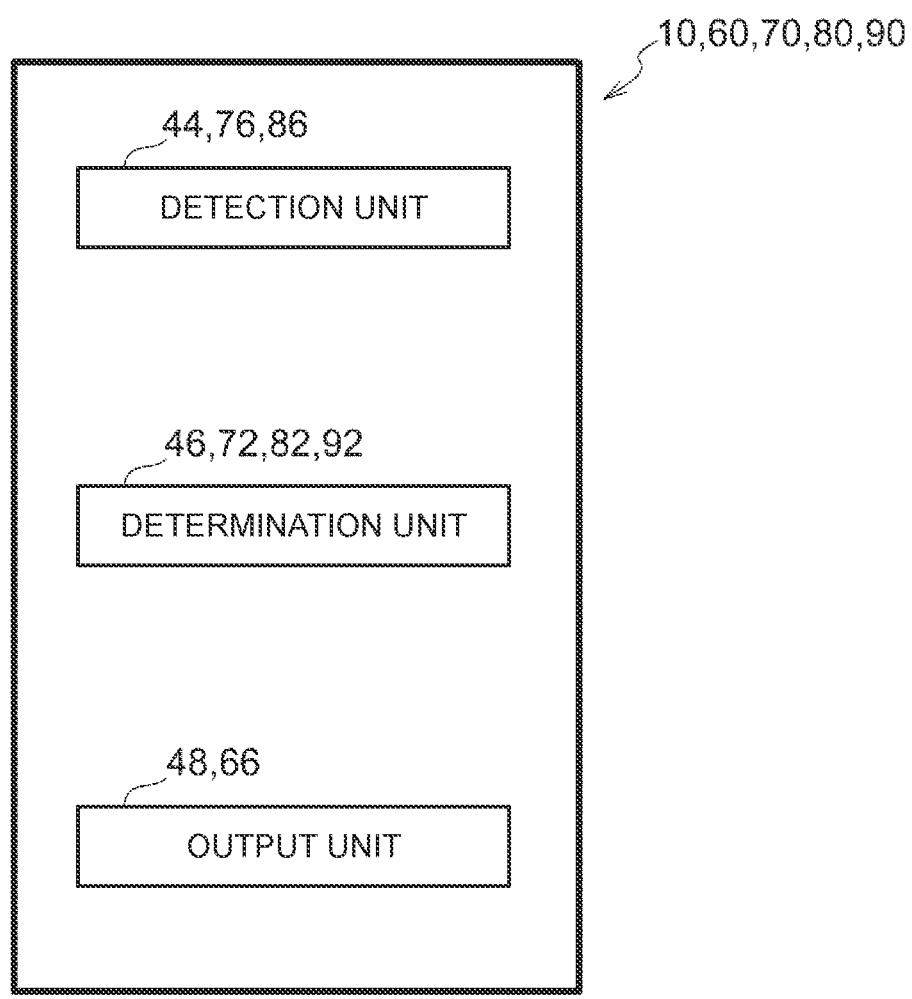
FIG. 3 is a block diagram illustrating functional configurations of the vehicle cabin control device according to the first embodiment.

FIG. 3 is a block diagram showing functional configurations of the vehicle cabin control device 10. The vehicle cabin control device 10 includes as the functional configurations a detection unit 44, a determination unit 46, and an output unit 48. The functional configurations are implemented by the CPU 12A of the ECU 12 reading and executing the vehicle cabin control program stored in the ROM 12B or the storage 12D (see FIG. 2).

The detection unit 44 detects the state of each occupant P riding in the vehicle 28. That is, the detection unit 44 detects on which vehicle seat 32 each occupant P is seated and whether information is shared between any of the mobile devices 42 of the occupants P, based on the position and operating state of each mobile device 42. The detection unit 44 also detects the operating state of each operation switch 24.

The determination unit 46 determines whether the state in which the occupants P can easily communicate with each other, namely the sharing state, is desirable, based on the state of the mobile device 42 of each occupant P sitting on the vehicle seat 32 as detected by the detection unit 44. Specifically, the determination unit 46 determines whether any content is being sent between any of the mobile devices 42 of the occupants P. When the determination unit 46 determines that content is being sent between the mobile devices 42 of the occupants P, the determination unit 46 presumes that "the occupants P will communicate with each other about the content" and determines that the sharing state is desirable.

When substantially the same information is being displayed on the mobile devices 42 of any of the occupants P, the determination unit 46 also presumes that "the occupants P will communicate with each other about the displayed information" and determines that the sharing state is desirable. When different information or content is being displayed on the mobile devices 42 of any of the occupants P, the determination unit 46 presumes that "the occupants P want to have private time" and determines that the sharing state is not desirable.

The determination unit 46 determines for which occupants P, namely for which vehicle seats 32 in the vehicle cabin 30, the sharing state is desirable based on the operating state of each mobile device 42. Similarly, the determination unit 40 determines for which occupant(s) P, namely for which vehicle seat(s) 32 in the vehicle cabin 30, the sharing state is not desirable based on the operating state of each mobile device 42. That is, the determination unit 46 determines whether the sharing state is desirable for specific ones of the occupants P and whether the sharing state is not desirable for other specific ones of the occupants P.

The determination unit 46 also determines whether the sharing state is desirable based on the operating state of each operation switch 24. For example, when any of the operation switches 24 is operated to swivel the vehicle seat 32 outward in the lateral direction of the vehicle 28 (outward in the vehicle cabin 30) (hereinafter referred to as "operated to the private mode"), the determination unit 46 determines that the sharing state is not desirable for the occupant P sitting on the vehicle seat 32 with the operated operation switch 24. When any of the operation switches 24 is operated to a side different from the private mode (i.e., operated to swivel the vehicle seat 32 inward in the lateral direction of the vehicle 28), the determination unit 46 determines that the sharing state is desirable for the occupant P sitting on the vehicle seat 32 with the operated operation switch 24.

Figure 6:
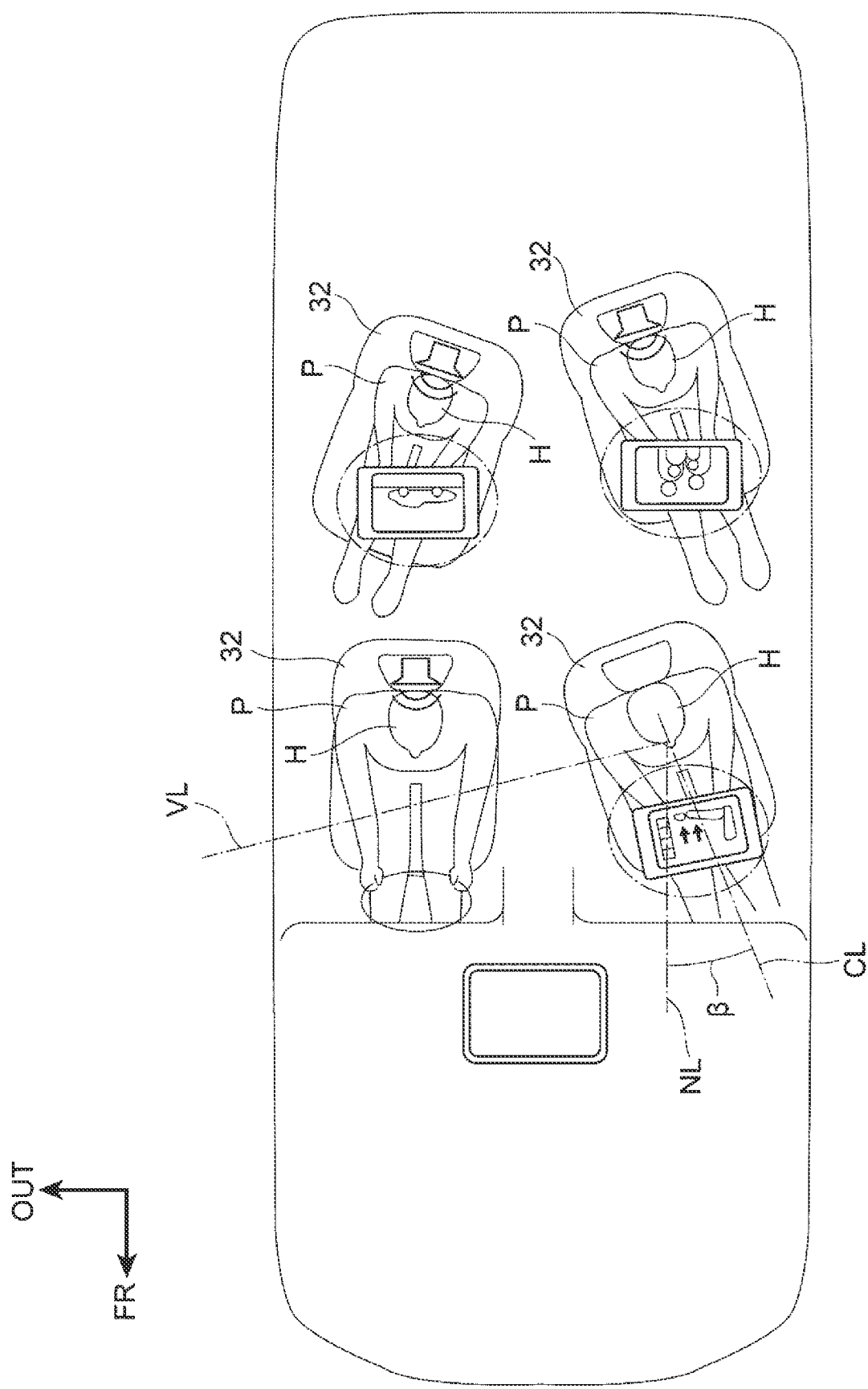
FIG. 6 is a schematic plan view illustrating an example of a private mode in the vehicle having the vehicle cabin control device according to the first embodiment.

The output unit 48 operates the vehicle seat operation devices 22 based on information on the determination of the determination unit 46. Specifically, when the determination unit 46 determines that the sharing state is not desirable, the output unit 48 can operate the vehicle seat operation devices 22 to swivel the vehicle seats 32 other than the driver's vehicle seat 32 outward in the lateral direction of the vehicle 28 (outward in the vehicle cabin 30) so that the bodies of the occupants P sitting on the vehicle seats 32 other than the driver's vehicle seat 32 face outward in the vehicle cabin 30. As shown in FIG. 6, the bodies of the occupants P sitting on the vehicle seats 32 other than the driver's vehicle seat 32 thus face outward in the lateral direction of the vehicle 28 (outward in the vehicle cabin 30). The occupants P are therefore less likely to come into sight of each other (this will be described in detail later), so that each of the occupants P can have private time without being distracted by the other occupants P.

Figure 8:
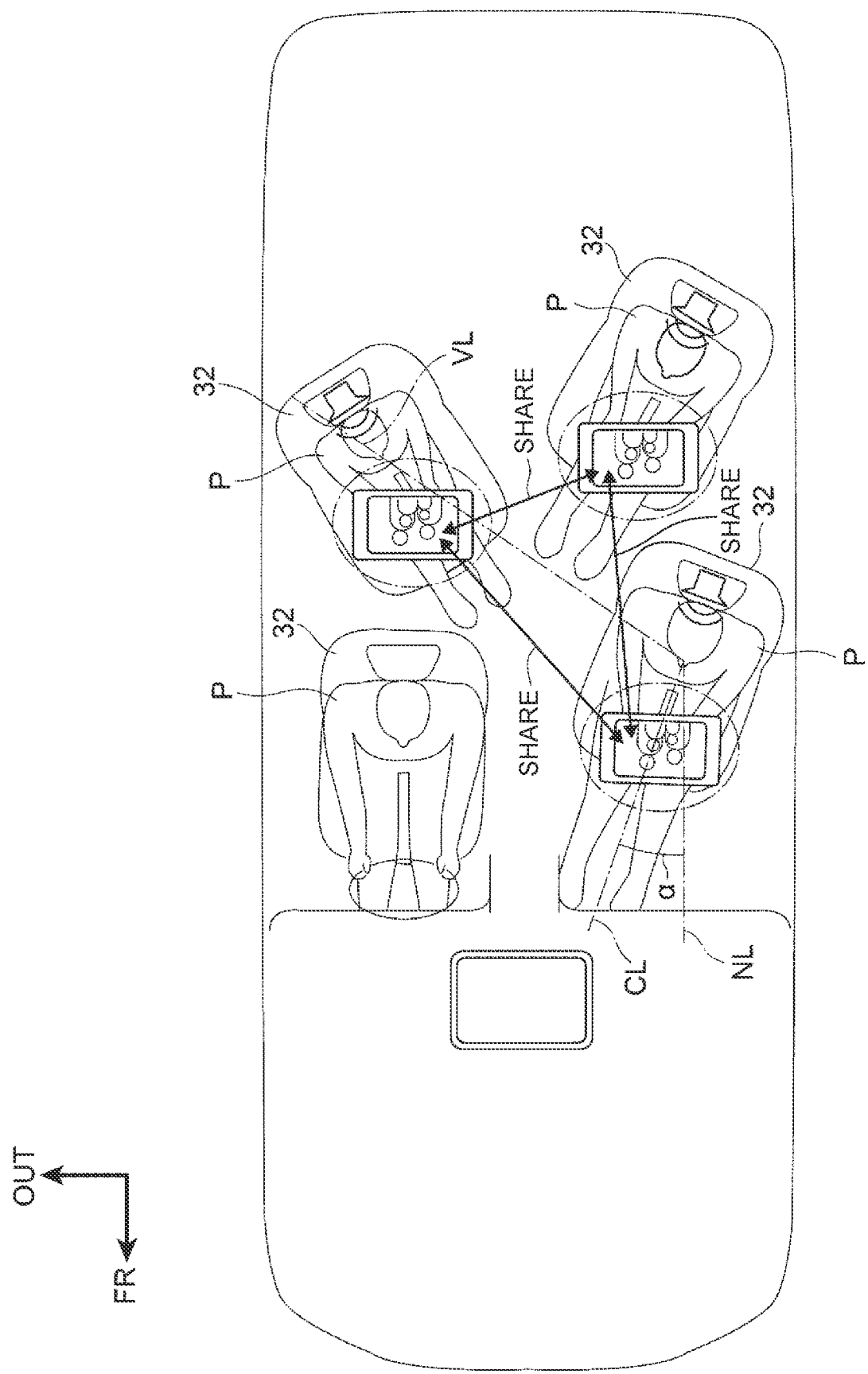
FIG. 8 is a schematic plan view illustrating a second form of the sharing state in the vehicle having the vehicle cabin control device according to the first embodiment.

When the determination unit 46 shown in FIG. 3 determines that the sharing state is desirable, the output unit 48 can operate the vehicle seat operation devices 27 to swivel the vehicle seats 32 other than the driver's vehicle seat 32 inward in the lateral direction of the vehicle 28 (inward in the vehicle cabin 30) so that the bodies of the occupants P sitting on the vehicle seats 32 other than the driver's vehicle seat 32 face inward in the vehicle cabin 30. As shown in FIG. 8, the bodies of the occupants P sitting on the vehicle seats 32 other than the driver's vehicle seat 32 thus face inward in the lateral direction of the vehicle 28 (inward in the vehicle cabin 30). These occupants P therefore easily come into sight of each other (this will be described in detail later), so that they can easily communicate with each other.

The output unit 48 operates the vehicle seat operation devices 22 to swivel the vehicle seats 32 inward in the lateral direction of the vehicle 28 (inward in the vehicle cabin 30) or outward in the lateral direction of the vehicle 28 (outward in the vehicle cabin 30) by about 20° about the vertical direction of the vehicle 28 from the normal state. The human viewing angle is typically at most about 104° with respect to a reference line CL in the anterior-posterior direction passing through the midpoint between human right and left eyes as viewed in plan (see VL in the figures). Accordingly, when the sharing state is desirable, the vehicle seats 32 are swiveled inward in the lateral direction of the vehicle 28 (inward in the vehicle cabin 30) by an angle α of 20° from the normal state (NL in the figure indicates a line in the front-back direction of the vehicle seat 32 in the normal state). The occupant P sitting on the vehicle seat 32 behind the driver's vehicle seat 32 thus easily comes into sight of the occupant P sitting on the passenger's vehicle seat 32. The occupant P sitting on the passenger's vehicle seat 32 can also easily visually recognize the occupant P sitting on the vehicle seat 32 behind the passenger's vehicle seat 32 by slightly turning his or her head inward in the lateral direction of the vehicle 28 (inward in the vehicle cabin 30). As shown in FIG. 6, when the sharing state is not desirable, the vehicle seats 32 are swiveled outward in the lateral direction of the vehicle 28 (outward in the vehicle cabin 30) by an angle β of 20° from the normal state. The occupants P, especially the heads H of the occupants P, are thus less likely to come into sight of each other. Each occupant P will therefore not be bothered by the other occupants P even when they are looking at the occupant P. The seating arrangement can thus be selectively switched between the mode in which the occupants P can easily communicate with each other and the mode in which the occupants P can easily have private time by swiveling the vehicle seats 32 inward in the lateral direction of the vehicle 28 (inward in the vehicle cabin 30) or outward in the lateral direction of the vehicle 28 (outward in the vehicle cabin 30) by a relatively small angle of about 20° from the normal state.

The output unit 48 shown in FIG. 3 operates the vehicle air conditioning unit 14, the vehicle audio system 16, and the car navigation system 18 based on the information on the determination of the determination unit 46. Specifically, when the determination unit 46 determines that the sharing state is not desirable, the output unit 48 can operate the vehicle air conditioning unit 14 and the vehicle audio system 16 for each vehicle seat 32. In the present embodiment, as shown in FIG. 6, in response to, e.g., operation of the mobile device 42 by the occupant P, the output unit 48 can choose whether to output conditioned air from the air outlets 36 (see FIG. 4) of the vehicle seat 32 on which this occupant P is seated and can adjust the temperature, volume, etc. of the conditioned air (see the mobile device 42 of the occupant P sitting on the passenger's vehicle seat 32 in the figure). When any of the occupants P sitting on the vehicle seats 32 is individually viewing content with the mobile device 42, the output unit 48 causes the vehicle audio system 16 to output sound corresponding to the content only to the occupant P viewing the content from the directional speaker 40 (see the mobile devices 42 of the occupants sitting on the rear vehicle seats 32 in the figure; in FIGS. 6 to 9, the output from the directional speakers 40 is schematically shown for better understanding). When any of the occupants P sitting on the vehicle seats 32 makes a phone call, the voice is output only to the occupant P who makes a phone call (see the occupant P sitting on the driver's vehicle seat 32 in the figure; in the figure, the occupant P is making a handsfree call).

Figure 7:
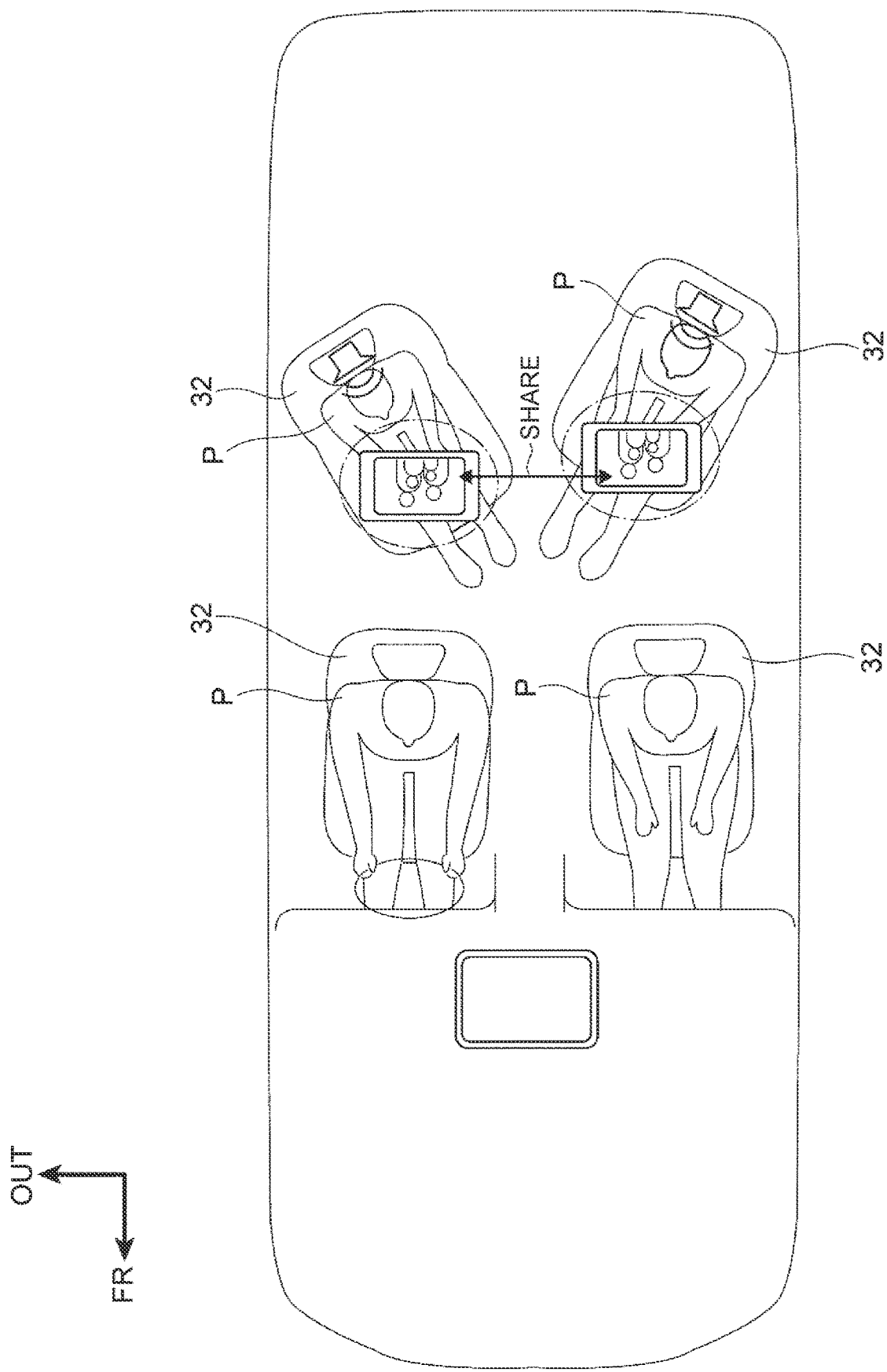
FIG. 7 is a schematic plan view illustrating a first form of a sharing state in the vehicle having the vehicle cabin control device according to the first embodiment.

As shown in FIG. 7, when information or content is sent between any of the mobile devices 42 so that information is shared between the mobile devices 42, and the determination unit 46 determines that the sharing state is desirable for the occupants P having these mobile devices 42, the output unit 48 operates the directional speakers 40 of the vehicle seats 32 of these occupants P to output the same sound corresponding to the content to these occupants P (see the occupants P sitting on the rear vehicle seats 32 in FIG. 7 and the occupants P sitting, on the rear vehicle seats 32 and the passenger's vehicle seat 32 in FIG. 8).

Figure 9:
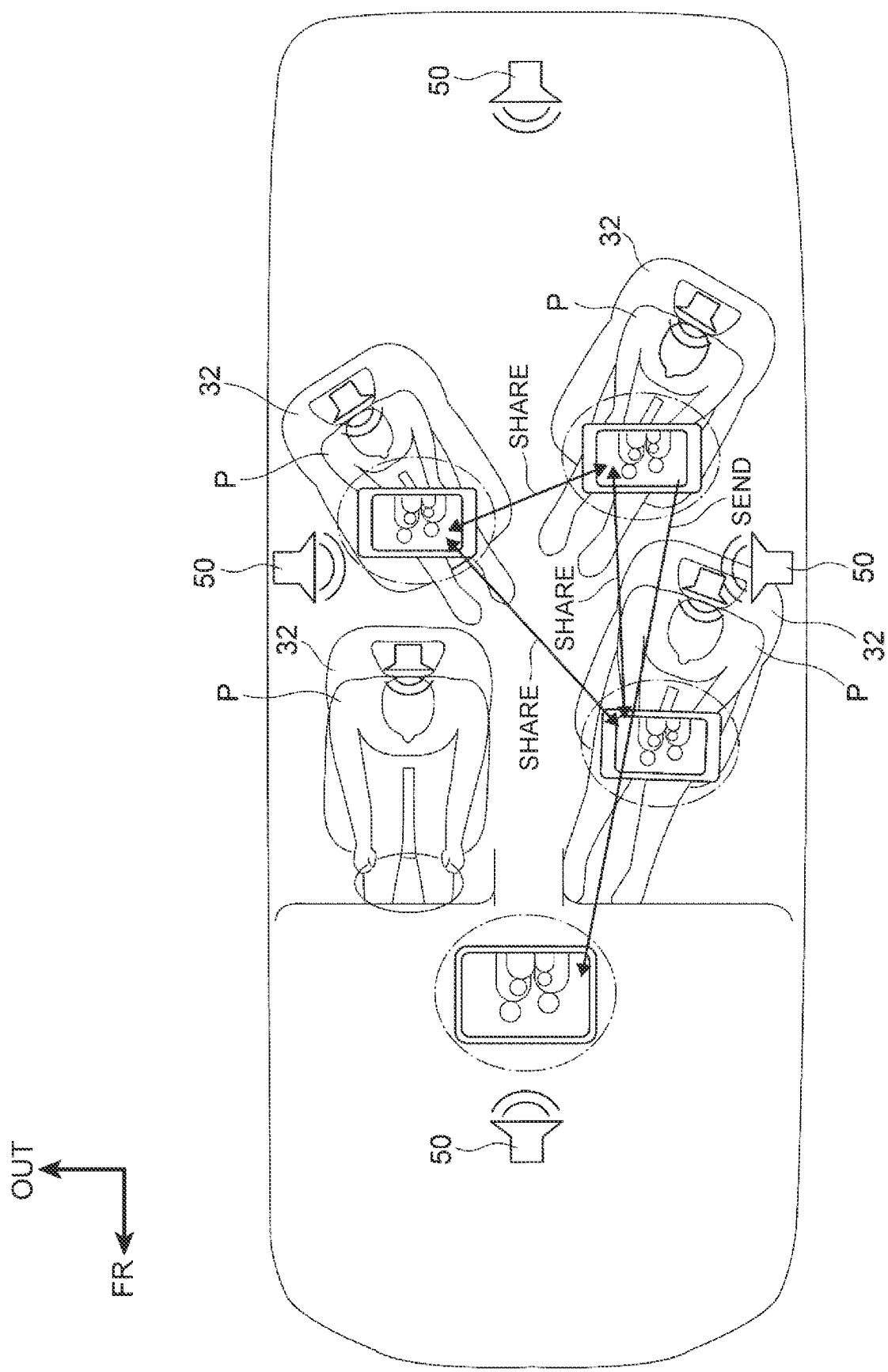
FIG. 9 is a schematic plan view illustrating a third form of the sharing state in the vehicle having the vehicle cabin control device according to the first embodiment.

As shown in FIG. 9, when any of the occupants P operates the mobile device 42 to send content to the car navigation system 18, the determination unit 46 determines that the sharing state is desirable for all the occupants P in the vehicle 28. Based on this determination, the output unit 48 displays on the car navigation system 18 substantially the same information as the content displayed on the mobile device 42 and outputs the same sound corresponding to the content from the speakers 50 mounted in the vehicle cabin 30. In FIG. 9, the occupant P operates the mobile device 42 to send content to the car navigation system 18, whereby substantially the same information as the content displayed on the mobile device 42 is displayed on the car navigation system 18. However the disclosure is not limited to this. When information or content is sent between the mobile devices 42 so that information is shared between the mobile devices 42, and the determination unit 46 determines that the sharing state is desirable, substantially the same information as the information or content displayed on the mobile devices 42 may be automatically obtained and displayed on the car navigation system 18.

Processing Flow

Figure 10:
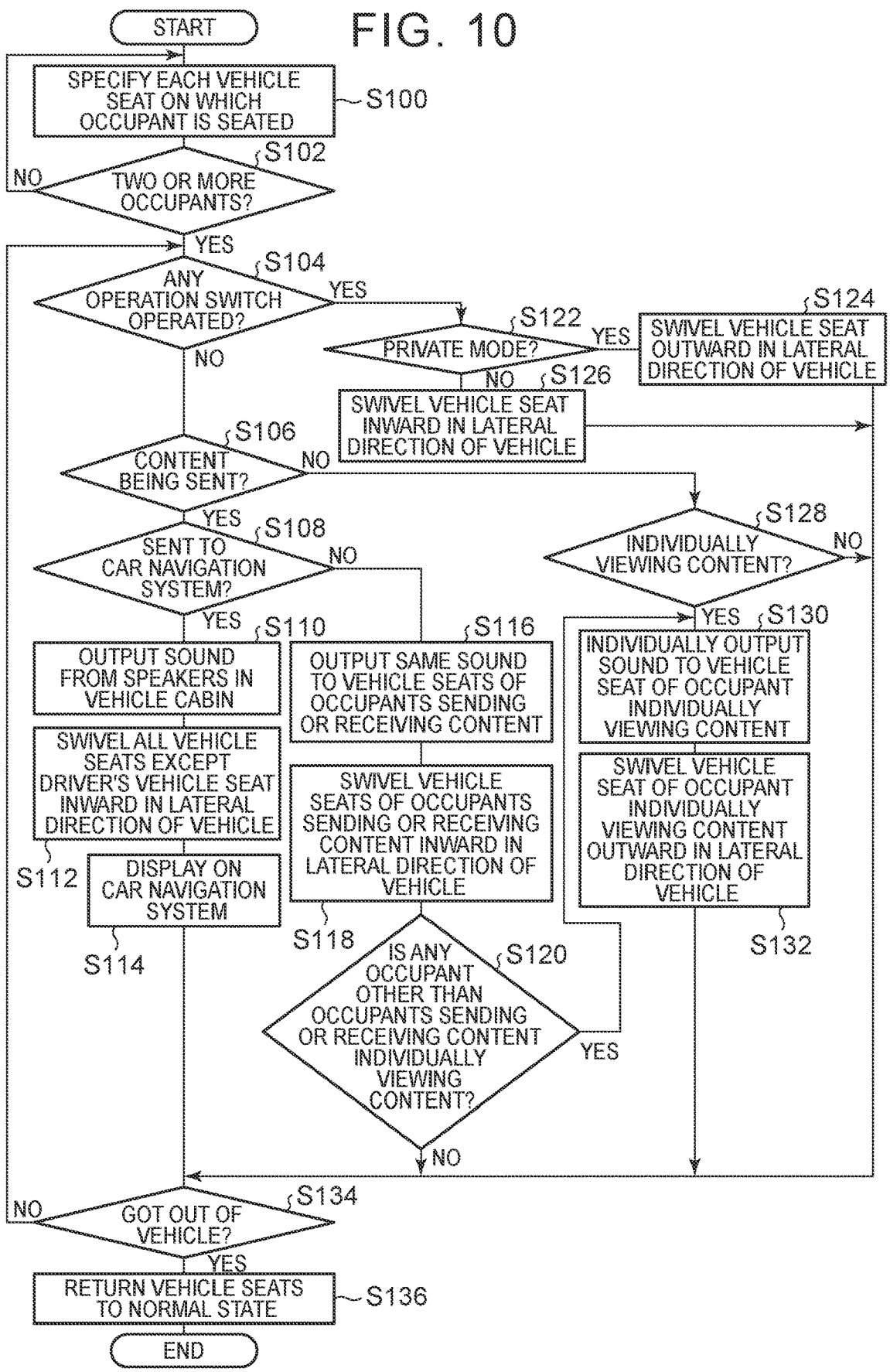
FIG. 10 is a flowchart illustrating the flow of operation of the vehicle cabin control device according to the first embodiment.

Next, functions of the vehicle cabin control device 10 will be described. FIG. 10 is a flowchart illustrating the flow of operation of the vehicle cabin control device 10. The CPU 12A reads the vehicle cabin control program from the ROM 12B or the storage 12D and loads and executes the vehicle cabin control program in the RAM 12C to perform processing based on the vehicle cabin control program.

The CPU 12A specifies on which of the vehicle seats 32 in the vehicle cabin 30 the occupants P are seated (step S100). The CPU 12A determines whether there are a plurality of occupants P in the vehicle 28 based on the information specifying the vehicle seat(s) 32 (step S102). When there is only one occupant P in the vehicle 28 (step S102: NO), the CPU 12A repeats the process from step S100.

When there are a plurality of occupants P in the vehicle 28 (step S102: YES), the CPU 12A determines whether any of the operation switches 24 has been operated (step S104). When any of the operation switches 24 has been operated (step S104: YES), the CPU 12A determines whether the operation switch 24 has been operated to the private mode (step S122). When the operation switch 24 has been operated to the private mode (step S122: YES), the CPU 12A operates the vehicle seat operation device 22 to swivel the vehicle seat 32 outward in the lateral direction of the vehicle 28 (outward in the vehicle cabin 30) from the normal state (step S124). The routine then proceeds to step S134 described later. When the operation switch 24 has been operated to the side different from the private mode (step S122: NO), the CPU 12A operates the vehicle seat operation device 22 to swivel the vehicle seat 37 inward in the lateral direction of the vehicle 28 (inward in the vehicle cabin 30) from the normal state (step S126). The routine then proceeds to step S134.

When none of the operation switches 24 have been operated (step S104: NO), the CPU 12A determines whether any content is being sent between any of the mobile device 42 of the occupants P (step S106). When no content is being sent between any of the mobile devices 42 of the occupants P (step S106: NO), the CPU 12A determines whether any of the occupants P is individually viewing content on his or her mobile device 42 (step S128). When none of the occupants P are individually viewing content on their mobile devices 42 (step S128: NO), the routine proceeds to step S134. When an of the occupants P is individually viewing content on his or her mobile device 42 (step S128: YES), the CPU 12A individually outputs sound corresponding to the content only to the occupant P individually viewing the content from the directional speaker 40 of the vehicle seat 32 on which this occupant P is seated (step S130). The CPU 12A also operates the vehicle seat operation device 22 to swivel the vehicle seat 32 on which this occupant P is seated outward in the lateral direction of the vehicle 28 (outward in the vehicle cabin 30) from the normal state (step S132). The routine then proceeds to step S134.

When content is being sent between the mobile devices 42 of the occupants P (step S106: YES), the CPU 12A determines whether the content has been sent from any of these mobile devices 42 to the car navigation system 18 (step S108). When the content has not been sent from any of these mobile devices 42 to the car navigation system 18 (step S108: NO), the CPU 12A individually outputs sound corresponding to the content only to the occupants P sending or receiving the content from the directional speakers 40 of the vehicle seats 32 on which these occupants P are seated (step S116). The CPU 12A also operates the vehicle seat operation devices 22 to swivel the vehicle seats 32 on which the occupants P sending or receiving the content are seated inward in the lateral direction of the vehicle 28 (inward in the vehicle cabin 10) from the normal state (step S118). The CPU 12A then determines whether any occupant P other than the occupants P sending or receiving the content is individually viewing content with his or her mobile device 42 (step S120). When there is any occupant P who is individually viewing content with his or her mobile device 42 (step S120: YES), the CPU 12A repeats the process from step S130. When no occupant P is individually viewing content (step S120: NO), the routine proceeds to step S134.

When the content has been sent from any of the mobile devices 42 to the car navigation system 18 (step S108: YES), the CPU 12A outputs the sound corresponding to the content to the entire vehicle cabin 30 from the directional speakers 40 and the speakers 50 mounted in the vehicle cabin 30 (step S110) and operates the vehicle seat operation devices 22 to swivel all the vehicle seats 32 on which the occupants P are seated except the driver's vehicle seat 32 inward in the lateral direction of the vehicle 28 (inward in the vehicle cabin 30) from the normal state (step S112). The CPU 12A displays the content on the car navigation system 18 (step S114).

The CPU 12A determines whether the occupants P have gotten out of the vehicle 28 (step S134). When the occupants P have not gotten out of the vehicle 28 (step S134: NO), the CPU 12A repeats the process from step S104. When the occupants P have gotten out of the vehicle 28 (step S134: YES), the CPU 12A operates the vehicle seat operation devices 22 to return the swiveled vehicle seats 32 to the normal state (step S136). The CPU 12A then terminates the processing based on the vehicle cabin control program.

Functions and Effects of First Embodiment

Functions and effects of the first embodiment will be described below.

In the present embodiment, the vehicle cabin control device 10 includes the vehicle seat operation devices 22, the detection unit 44, the determination unit 46, and the output unit 48. The vehicle seat operation devices 22 can individually change the orientations of the seating surfaces of the vehicle seats 32 mounted in the vehicle cabin 30. The orientations of the bodies of the occupants P sitting on the vehicle seats 32 can thus be changed. The detection unit 44 detects the states of the occupants P sitting on the vehicle seats 32. The determination unit 46 determines whether the sharing state, namely the state in which the occupants P can easily communicate with each other, is desirable based on the detection results of the detection unit 44. When the determination unit 46 determines that the sharing state is desirable, the output unit 48 operates the vehicle, seat operation devices 22 corresponding to the vehicle seats 32 where the occupants P for whom the sharing state is desirable are seated so as to change the orientations of the bodies of these occupants P to such orientations that these occupants P easily communicate with each other. This facilitates active communication between these occupants P.

When the determination unit 46 determines that the sharing state is not desirable, the output unit 48 operates the vehicle seat operation device 22 corresponding the vehicle seat 32 where the occupant P for whom the sharing state is not desirable is seated so as to change the orientation of the body of the occupant P for whom the sharing state is not desirable to such an orientation that the occupant P does not easily communicate with the other occupants P. The occupant P for whom the sharing state is not desirable can thus easily have private time. That is, by detecting the states of the occupants P, an appropriate space can be created in the vehicle cabin 30 in accordance with the atmosphere in the vehicle cabin 30 at the time. The occupants P thus feel more comfortable in the vehicle cabin 30.

Each of the seating surface changing devices includes the swivel mechanism 22A that swivels the vehicle seat 32 substantially about the vertical direction of the vehicle 28. Accordingly, the orientations of the bodies of the occupants P sitting on the vehicle seats 32 can be easily changed by operating the swivel mechanisms 22A so as to swivel the vehicle seats 32 substantially in the horizontal direction. The orientations of the bodies of the occupants sitting on the vehicle seats 32 can thus be more reliably changed.

When the determination unit 46 determines that the sharing state is desirable for all of the occupants P, the output unit 48 operates the vehicle seat operation devices 22 so that the bodies of all the occupants P face each other. The occupants P thus easily come into sight of each other, which facilitates active communication between the occupants P. The occupants P thus feel more comfortable in the vehicle cabin 30 in situations where the occupants P want to communicate with each other.

When the determination unit 46 determines that the sharing state in which specific ones of the occupants P can easily communicate with each other is desirable, the output unit 48 operates the vehicle seat operation devices 22 of the vehicle seats 32 of the specific occupants P so that the bodies of the specific occupants P face each other. The specific occupants P thus easily come into sight of each other which facilitate communication between the specific occupants P. An appropriate space can thus be created in the vehicle cabin 30 in accordance with the individual situations of the occupants P riding in the vehicle 28. Accordingly, in the case where the occupants P in various states are riding in the vehicle 28, the occupants P feel more comfortable in the vehicle cabin 30.

When the determination unit 46 determines that the sharing state is not desirable for any of the occupants P, the output unit 48 operates all of the vehicle seat operation devices 22 so that the bodies of all the occupants P face outward in the vehicle cabin 30. The occupants P are thus less likely to come into sight of each other, so that the occupants P can easily have private time. The occupants P thus feel more comfortable in situations where the occupants P do not need to communicate with each other.

When the determination unit 46 determines that the sharing state is not desirable for a specific one of the occupants P, the output unit 48 operates the vehicle seat operation device 22 so that the body of the specific occupant P faces outward in the vehicle cabin 30. The other occupants P are thus likely to come into sight of the specific occupant P, so that the specific occupant P can easily have private time. A more appropriate space can thus be created in the vehicle cabin 30 in accordance with the individual situations of the occupants P riding in the vehicle 28. Accordingly, in the case where the occupants P in various states are riding in the vehicle 28, the occupants P feet more comfortable in the vehicle cabin 30.

The detection unit 44 detects the operating state of at least one of the operation switches 24 mounted in the vehicle cabin 30 and capable of being operated by the occupants P sitting on the vehicle seats and the determination unit 46 determines whether the sharing state is desirable in accordance with the detection results of the detection unit 44. An appropriate space can be created in the vehicle cabin 30 according to the intention of each occupant P who operates the operation switch 24. The occupants P thus feel more comfortable in the vehicle cabin 30.

The detection unit 44 also detects the states of the mobile devices 42 of at least two of the occupants P, and the determination unit 46 determines that the sharing state is desirable when information is shared between any of the mobile devices 42. That is, since the determination unit 46 determines whether the sharing state is desirable based on whether information is shared between any of the mobile devices 42, namely between those occupants P who are likely to communicate with each other, a more appropriate space can be created in the vehicle cabin 30.

The display 18A of the car navigation system 18 is mounted in the vehicle cabin 30. The output unit 48 displays information on the display 18A when the determination unit 46 determines that the sharing state is desirable. The output unit 48 operates the vehicle seat operation devices 22 so that the bodies of the occupants P face the display 18A with information being displayed thereon. That is, when the sharing state is desirable, the occupants P can easily look at the display 18A. Accordingly, the display 18A serves as what is called a focal point, so that the occupants P can more actively communicate with each other and feel closer to each other.

When the determination unit 46 determines that information is shared between any of the mobile devices 42, the output unit 48 displays on the display 18A substantially the same in as the information displayed on the mobile devices 42 sharing the information. The plurality occupants P tend to look at the display 18A, so that the occupants P are more likely to feel closer to each other. The occupants P thus feel more comfortable in the vehicle cabin 30 in situations where the occupants 13 want to communicate with each other.

When the determination unit 46 determines that the sharing state is desirable for any of the vehicle seats 32, the same information can be output to the vehicle seats 32 for which the determination unit 46 determines that the sharing state is desirable from corresponding ones of the directional speakers 40. When the determination unit 46 determines that the sharing state is not desirable for any of the vehicle seats 32, information can be individually output to each of the vehicle seats 32 for which the determination unit 46 determines that the sharing state is not desirable from a corresponding one of the directional speakers 40. Accordingly, when the sharing state is desirable, the occupants P can listen to the same sound and thus can more smoothly communicate with each other. When the sharing state is not desirable, the occupants P can individually listen to sound so that the other occupants P cannot or hardly hear the sound. The occupants P can therefore more enjoy private time. The occupants P thus feel more comfortable in the vehicle cabin 30.

Each vehicle seat 32 is provided with the air outlets 36 connected to the vehicle air conditioning unit 14. When the determination unit 46 determines that the sharing state is not desirable for any of the vehicle seats 32, conditioned air can be individually output to the vehicle seats 32 for which the determination unit 46 determines that the sharing state is not desirable from corresponding ones of the an outlets 36. An air conditioning environment in accordance with the preference of each occupant P sitting on the vehicle seat 32 can thus be provided. The occupants P can therefore have more comfortable private time. The occupants P thus feel more comfortable in the vehicle cabin 30 in situations where the occupants P do not need to communicate with each other.

The vehicle cabin control device 10 is configured to swivel the vehicle seats 32 about the vertical direction of the vehicle 28. However, the disclosure is not limited to this configuration, and the vehicle cabin control device 10 may also move the vehicle seats 32 in the longitudinal direction of the vehicle 28.

The determination unit 46 is configured to determine whether the sharing state is desirable based on the detection results of the detection unit 44, namely based on the detected states of the mobile devices 42 of the occupants P. However the disclosure is not limited to this configuration. The determination unit 46 may determine whether the sharing state is desirable based only on the operating states of the operation switches 24, namely without using the detection results of the states of the mobile devices 42. Alternatively, the determination unit 46 may determine whether the sharing state is desirable based only on the detection results of the states of the mobile devices 42 of the occupants P obtained by the detection unit 44, namely without using the operating states of the operation switches 24.

Second Embodiment

A vehicle cabin control device according to a second embodiment of the disclosure will be described with reference to FIGS. 3 and 11 to 13. The same constituent portions as those of the first embodiment etc. described above are denoted with the same reference characters and description thereof will be omitted.

The basic configuration of a vehicle cabin control device 60 according to the second embodiment is similar to that of the first embodiment. A feature of the vehicle cabin control device 60 is that each vehicle seat operation device 62 includes air pads 62B.

Hardware Configuration

Figure 11:
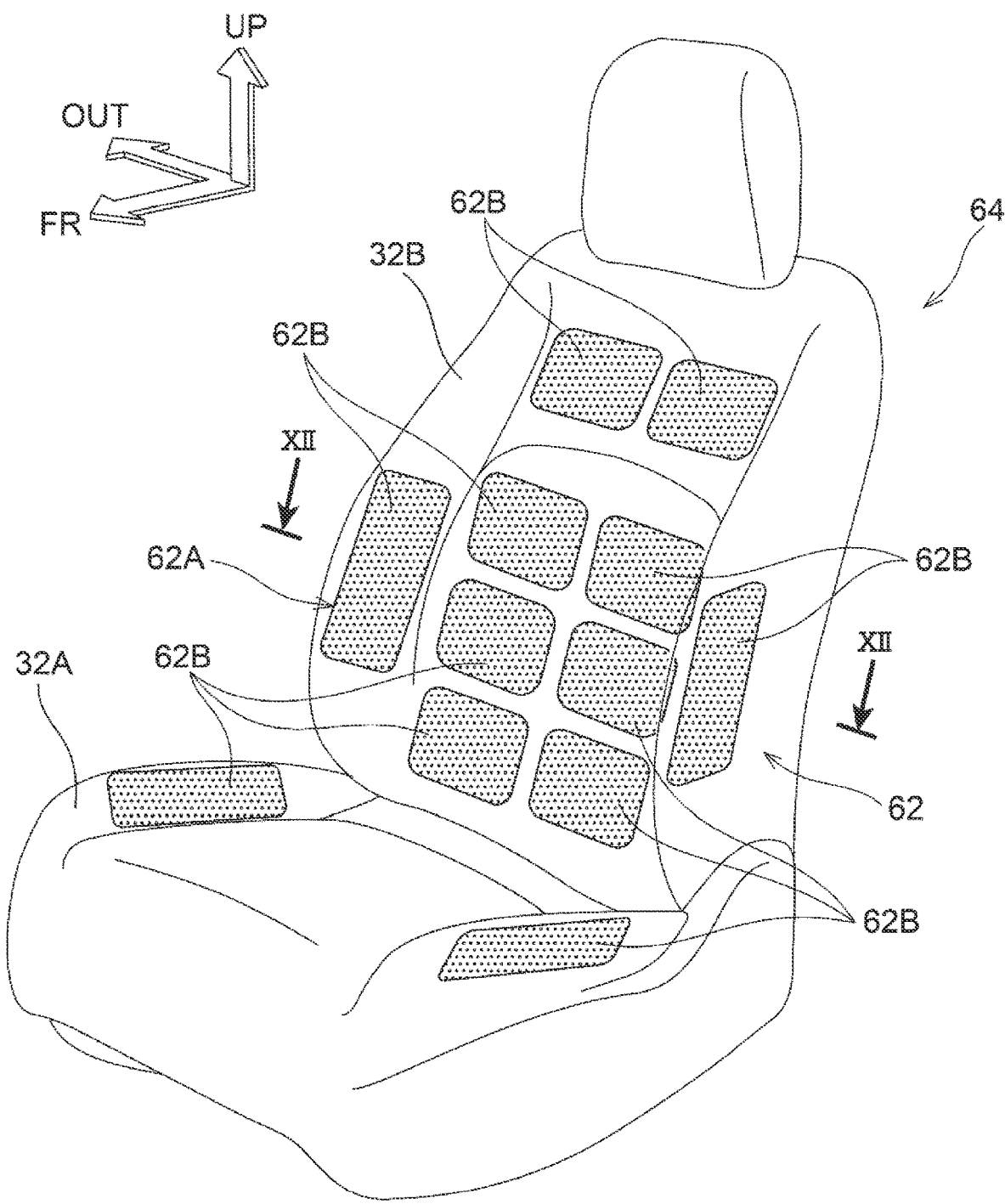
FIG. 11 is a schematic perspective view of a vehicle seat in a vehicle having a vehicle cabin control device according to a second embodiment.

As shown in FIG. 11, the vehicle seat operation device 62, which is the seating surface changing device, has a variable seating surface mechanism 62A. The variable seating surface mechanism 62A includes air pads 628 and a pumping unit, not shown. Specifically, a plurality of air pads 62B are provided in the vehicle seat 64. The air pads 62B are disposed between a seat cushion pad, not shown, provided inside the seat cushion 32A of the vehicle seat 64 and comprised of urethane foam etc. and the seat cushion frame 32D (see FIG. 5) and between a seatback cushion pad 64A (see FIG. 12) provided inside the seatback 32B and comprised of urethane foam etc. and the seatback frame 32E (see FIG. 5). For example, the seat cushion 32A has air pads 62B in a pair of side support portions located on the outer side in the lateral direction of the vehicle. The seatback 32B has air pads 62B in a pair of side support portions located on the outer side in the lateral direction of the vehicle and also has a plurality of (in the present embodiment, four) pairs of right and left air pads 62B in the middle portion between the pair of side support portions. The pairs of right and left air pads 62B in the middle portion are arranged symmetrically with respect to the centerline of the vehicle seat 64 in the lateral direction of the vehicle.

Figure 12:
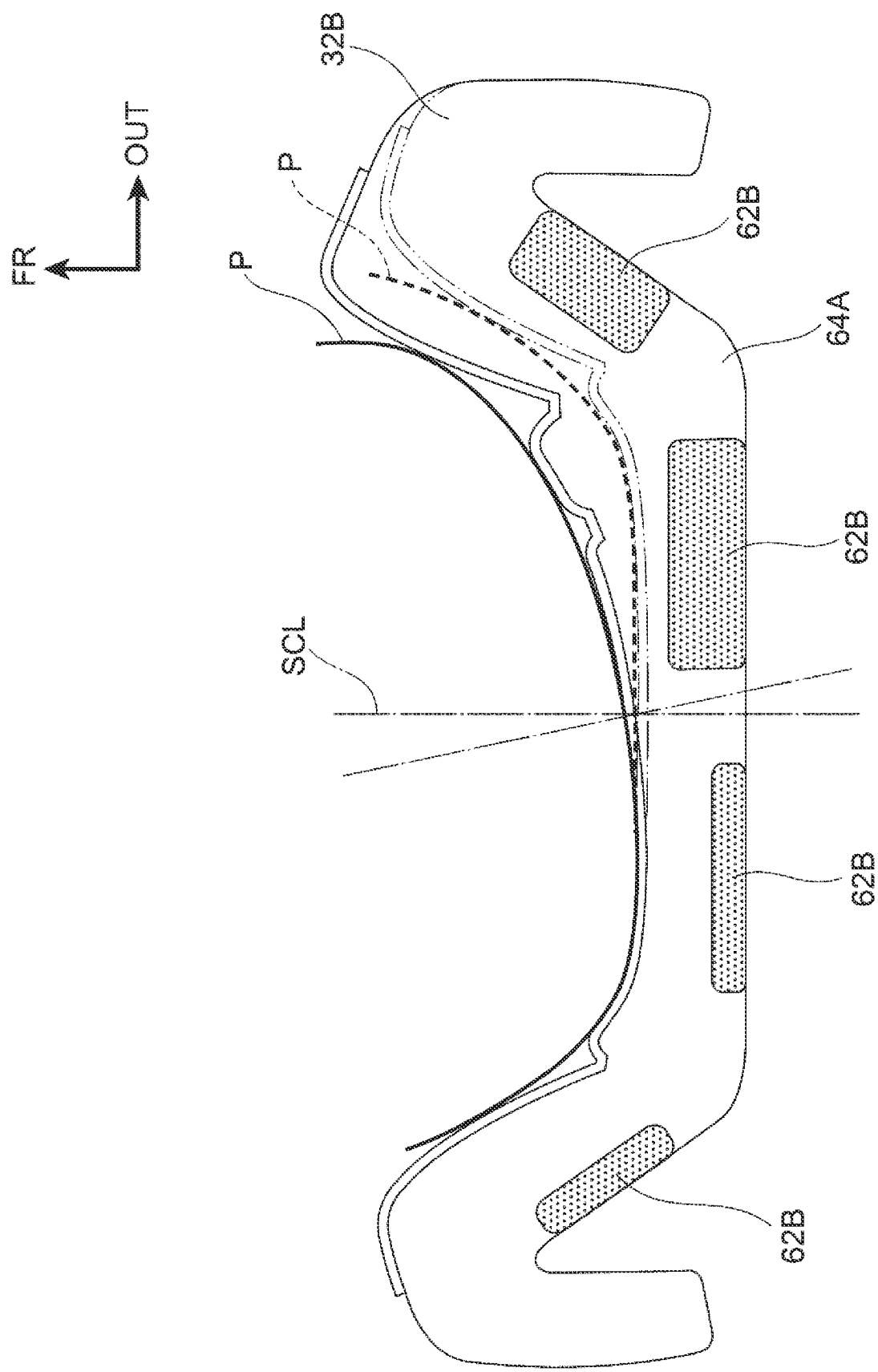
FIG. 12 is an enlarged section taken along XII-XII in FIG. 11.

The plurality of air pads 62B are connected to the pumping unit and can be inflated and deployed as shown in FIG. 12 by air supplied by the pumping unit (see the air pads 62B located outside the centerline SCL in the lateral direction of the vehicle in the figure the centerline SCL is the centerline in the lateral direction of the vehicle seat 64). As the air pads 62B are inflated and deployed, the seat cushion pad and the seatback pad are deformed to deform the seating surface of the vehicle seat 64. The deformation shape of the seating surface can be changed by inflating and deploying only a part of the air pads 62B. That is, one side of the seating surface in the lateral direction of the vehicle is pushed inward in the vehicle cabin 30 by inflating and deploying the air pads 62B located on the one side in the lateral direction of the vehicle. The body of the occupant P sitting on the vehicle seat 64 is thus tilted toward the one side in the lateral direction of the vehicle (is displaced from the state shown by dashed line to the state shown by solid line in the figure). The orientation of the body of the occupant P can thus be changed. The state in which none of the air pads 62B are inflated and deployed, namely the state in which the seating surface of the vehicle seat 64 is not deformed, corresponds to the "normal state."

Functional Configurations

FIG. 3 is a block diagram showing functional configurations of the vehicle cabin control device 60. The vehicle cabin control device 60 includes as the functional configurations the detection unit 44, the determination unit 46, and an output unit 66. The functional configurations are implemented by the CPU 12A of the ECU 12 reading and executing the vehicle cabin control program stored in the ROM 12B or the storage 12D (see FIG. 2).

The output unit 66 operates the vehicle seat operation devices 62 based on information on determination of the determination unit 46. Specifically when the determination unit 46 determines that the sharing state is desirable, the output unit 66 can individually operate the air pads 62B of the vehicle seats 64 other than the driver's vehicle seat 64 to tilt the bodies of the occupants P sitting on these vehicle seats 64 inward in the vehicle cabin 30. More specifically, the output unit 66 operates the vehicle seat operation devices 62 to inflate and deploy the air pads 62B located on the outer side in the lateral direction of the vehicle out of the pairs of right and left air pads 62B (hereinafter simply referred to as "inflate and deploy the air pads 62B located on the outer side in the lateral direction of the vehicle"). As shown in FIG. 12, the bodies of the occupants P sitting on the vehicle seats 64 other than the driver's vehicle seat 64 are thus tilted inward in the lateral direction of the vehicle (inward in the vehicle cabin 30). These occupants P therefore easily, come into sight of each other and can easily communicate with each other.

When the determination unit 46 determines that the sharing state is not desirable, the output unit 66 can operate the vehicle seat operation devices 62 of the vehicle seats 64 other than the driver's vehicle seat 64 to inflate and deploy the air pads 62B located on the inner side in the lateral direction of the vehicle out of the pairs of right and left air pads 62B (hereinafter simply referred to as "inflate and deploy the air pads 62B located on the inner side in the lateral direction of the vehicle") so that the bodies of the occupants sitting on the vehicle seats 64 other than the driver's vehicle seat 64 are tilted outward in the lateral direction of the vehicle (outward in the vehicle cabin 30). Since the bodies of the occupants P sitting on the vehicle seats 64 other than the driver's vehicle seat 64 are thus tilted outward in the lateral direction of the vehicle (outward in the vehicle cabin 30), the occupants P are less likely to come into sight of each other, so that each of the occupants P can have private time without being distracted by the other occupants P.

As in the first embodiment, the output unit 66 operates the vehicle air conditioning unit 14, the vehicle audio system 16, and the car navigation system 18 based on the information on determination of the determination unit 46.

Processing Flow

Figure 13:
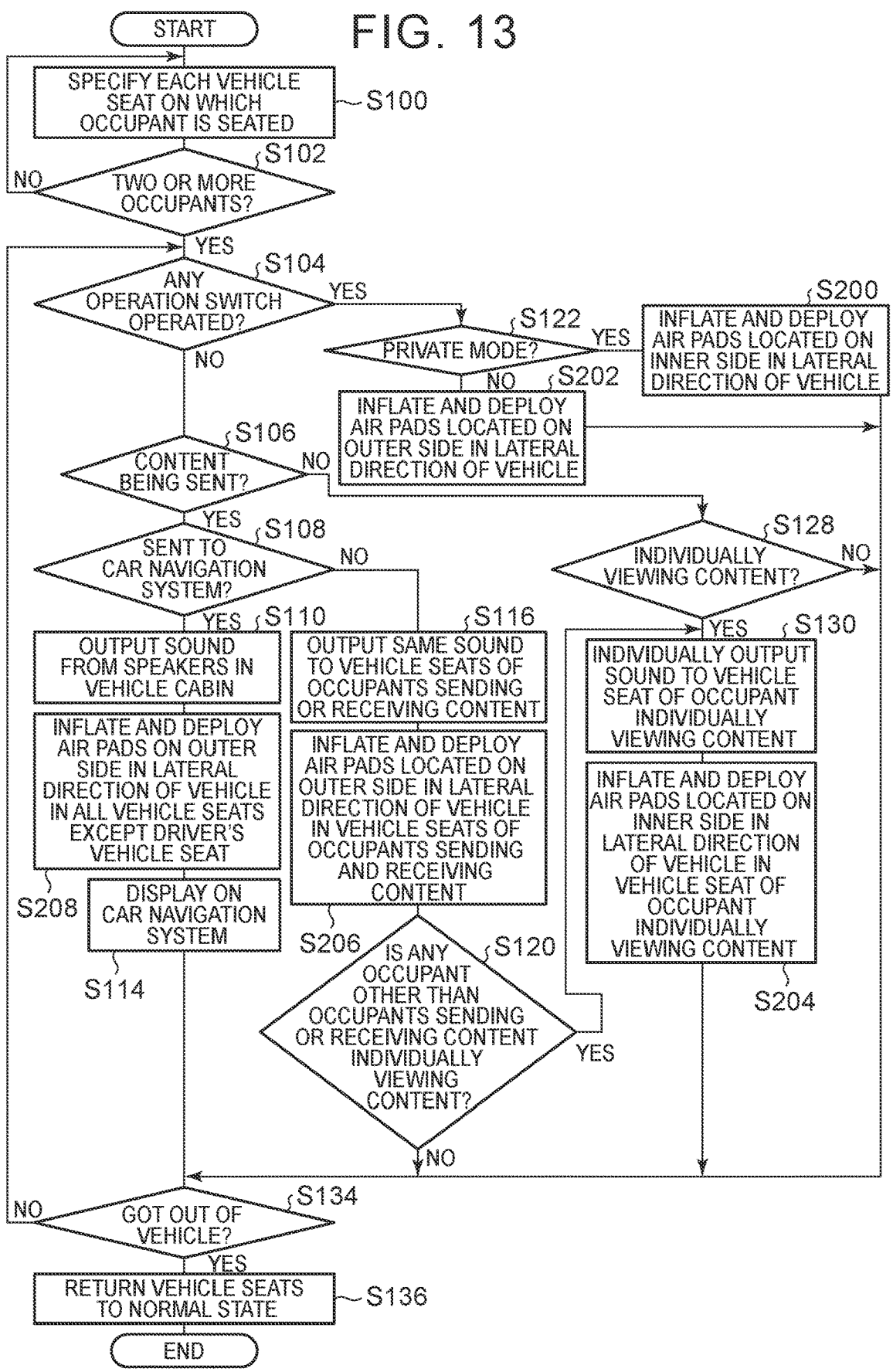
FIG. 13 is a flowchart illustrating the flow of operation of the vehicle cabin control device according to the second embodiment.

Next, functions of the vehicle cabin control device 60 will be described. FIG. 13 is a flowchart illustrating the flow of operation of the vehicle cabin control device 60. The CPU 12A reads the vehicle cabin control program from the ROM 12B or the storage 12D and loads and executes the vehicle cabin control program in the RAM 12C to perform processing based on the vehicle cabin control program. The same steps as those of the first embodiment are denoted with the same reference characters and description thereof will be omitted.

When the determination unit 46 determines in step S122 that any of the operation switches 24 has been operated to the private mode (step S122: YES), the CPU 12A operates the vehicle seat operation device 62 of the vehicle seat 64 to inflate and deploy the air pads 62B located on the inner side in the lateral direction of the vehicle from the normal state (step S200). The routine then proceeds to step S134 described later. The body of the occupant P sitting on the vehicle seat 64 with the inflated and deployed air pads 62B is thus tilted outward in the lateral direction of the vehicle (outward in the vehicle cabin 30).

When any of the operation switches 24 has been operated to the side different from the private mode (step S122: NO), the CPU 12A operates the vehicle seat operation device 62 of the vehicle seat 64 to inflate and deploy the air pads 62B located on the outer side in the lateral direction of the vehicle from the normal state (step S204). The routine then proceeds to step S134. The body of the occupant P sitting on the vehicle seat 64 with the inflated and deployed air pads 62B is thus tilted inward in the lateral direction of the vehicle (inward in the vehicle cabin 30).

After step S130, the CPU 12A operates the vehicle seat operation device 42 of the vehicle seat 64 on which the occupant P individually viewing content is seated to inflate and deploy the air pads 62B located on the inner side in the lateral direction of the vehicle from the normal state (step S204). The routine then proceeds to step S134. The body of the occupant P sitting on the vehicle seat 64 with the inflated and deployed air pads 623 is thus tilted outward in the lateral direction of the vehicle (outward in the vehicle cabin 30).

After step S116, the CPU 12A operates the vehicle seat operation devices 22 of the vehicle seats 44 on which the occupants P sending or receiving content are seated to inflate and deploy the air pads 62B located on the outer side in the lateral direction of the vehicle from the normal state (step S206). The routine proceeds to step S120. The bodies of the occupants P sitting on the vehicle seats 64 with the inflated and deployed air pads 62B are thus tilted inward in the lateral direction of the vehicle (inward in the vehicle cabin 30).

After step S110, the CPU 12A operates the vehicle seat operation devices 22 of all the vehicle seats 64 on which the occupants P are seated except the driver's vehicle seat 64 to inflate and deploy the air pads 62B located on the outer side in the lateral direction of the vehicle from the normal state (step S208). The bodies of the occupants P sitting on the vehicle seats 64 with the inflated and deployed air pads 62B are thus tilted inward in the lateral direction of the vehicle (inward in the vehicle cabin 30). The routine then proceeds to step S114.

Functions and Effects of Second Embodiment

Next, functions and effects of the second embodiment will be described.

With the above configuration, the vehicle cabin control device 60 is configured in a manner similar to that of the vehicle cabin control device 10 of the first embodiment except that the vehicle seat operation devices 62 include the air pads 62B. The vehicle cabin control device 60 therefore has effects similar to those of the first embodiment. Each of the vehicle seat operation devices 62 includes the variable seating surface mechanism 62A that changes the shape of the seating surface of the vehicle seat 64. Accordingly, the orientations of the bodies of the occupants P can be changed by operating the variable seating surface mechanisms 62A so as to tilt the bodies of the occupants P sitting on the vehicle seats 64. The orientations of the bodies of the occupants P can therefore be changed even when there is not enough space in the vehicle cabin 30.

In the present embodiment, the air pads 62B are configured to be inflated and deployed. However, the disclosure is not limited to this configuration. The air pads 62B may be configured to be deflated by the pumping unit. That is, the air pads 62B of the vehicle seats 64 are inflated to some extent in the normal state, and the air pads 62B to be inflated and deployed and the air pads 62B to be deflected are combined as necessary (the air pads 62B located on one side in the lateral direction of the vehicle are inflated and deployed and the air pads 62B located on the other side in the lateral direction of the vehicle are deflected), whereby the inclination of the body of the occupant P sitting on the vehicle seat 64 can be increased.

The vehicle seat operation devices 62 are configured to have the air pads 62B in each of the seat cushion 32A and the seatback 32B. However, the disclosure is not limited to this configuration. The vehicle seat operation devices 62 may be configured to have the air pads 62B only in the seatback 32B. The vehicle seat operation devices 62 may be configured to further include a swivel mechanism as in the vehicle seat operation devices 22 of the first embodiment. Alternatively, both the vehicle seat(s) 32 having the vehicle seat operation device 22 and the vehicle seat(s) 64 having the vehicle seat operation device 62 may be mounted in the same vehicle 28.

Third Embodiment

A vehicle cabin control device according to a third embodiment of the disclosure be described with reference to FIGS. 3, 14, and 15. The same constituent portions as those of the first embodiment etc. described above are denoted with the same reference characters and description thereof will be omitted.

The basic configuration of a vehicle cabin control device 70 according to the third embodiment is similar to that of the first embodiment. A feature of the vehicle cabin control device 70 is that a determination unit 72, which is the determination unit, determines whether the sharing state is desirable based on the speech of the occupants P.

Hardware Configuration

Figure 14:
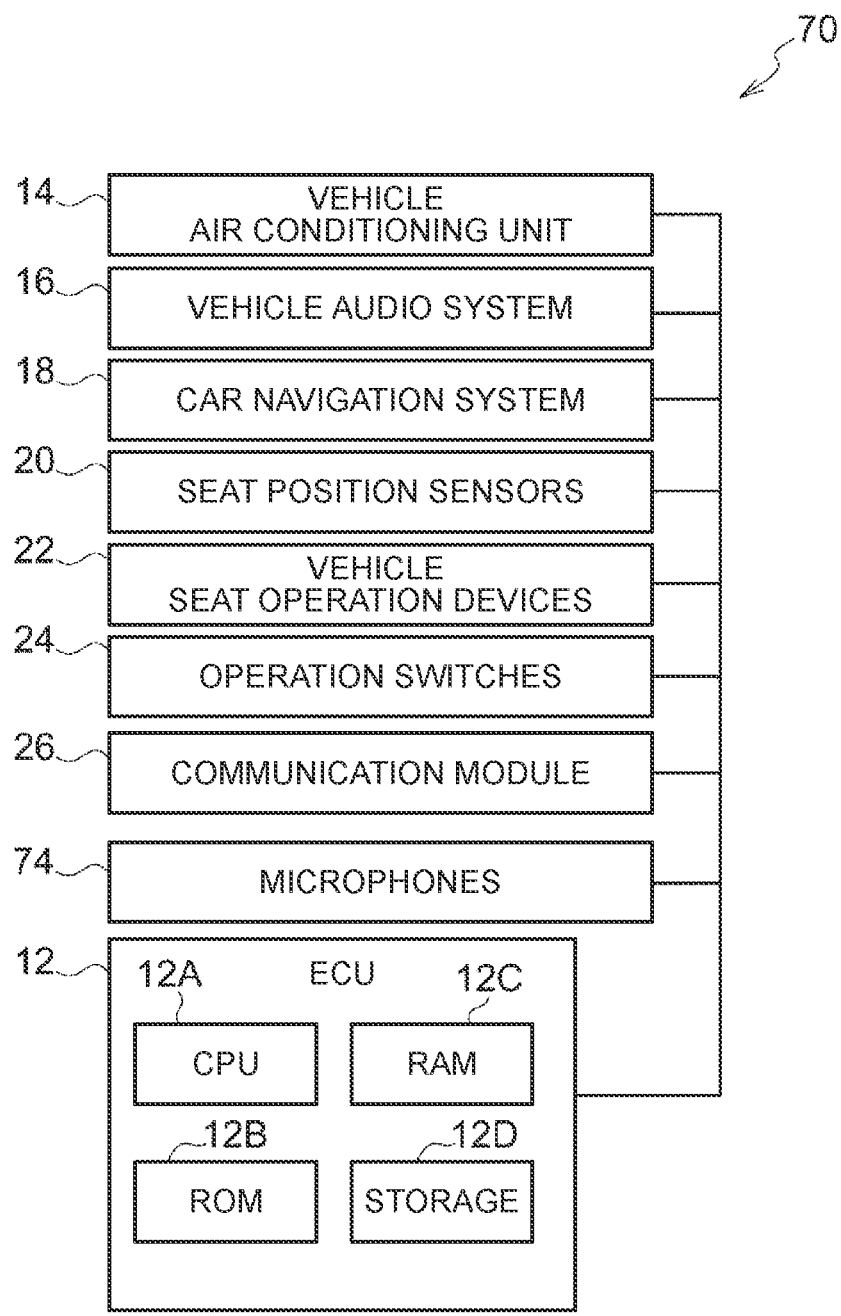
FIG. 14 is a block diagram illustrating a hardware configuration of a vehicle cabin control according to a third embodiment.
Figure 15:
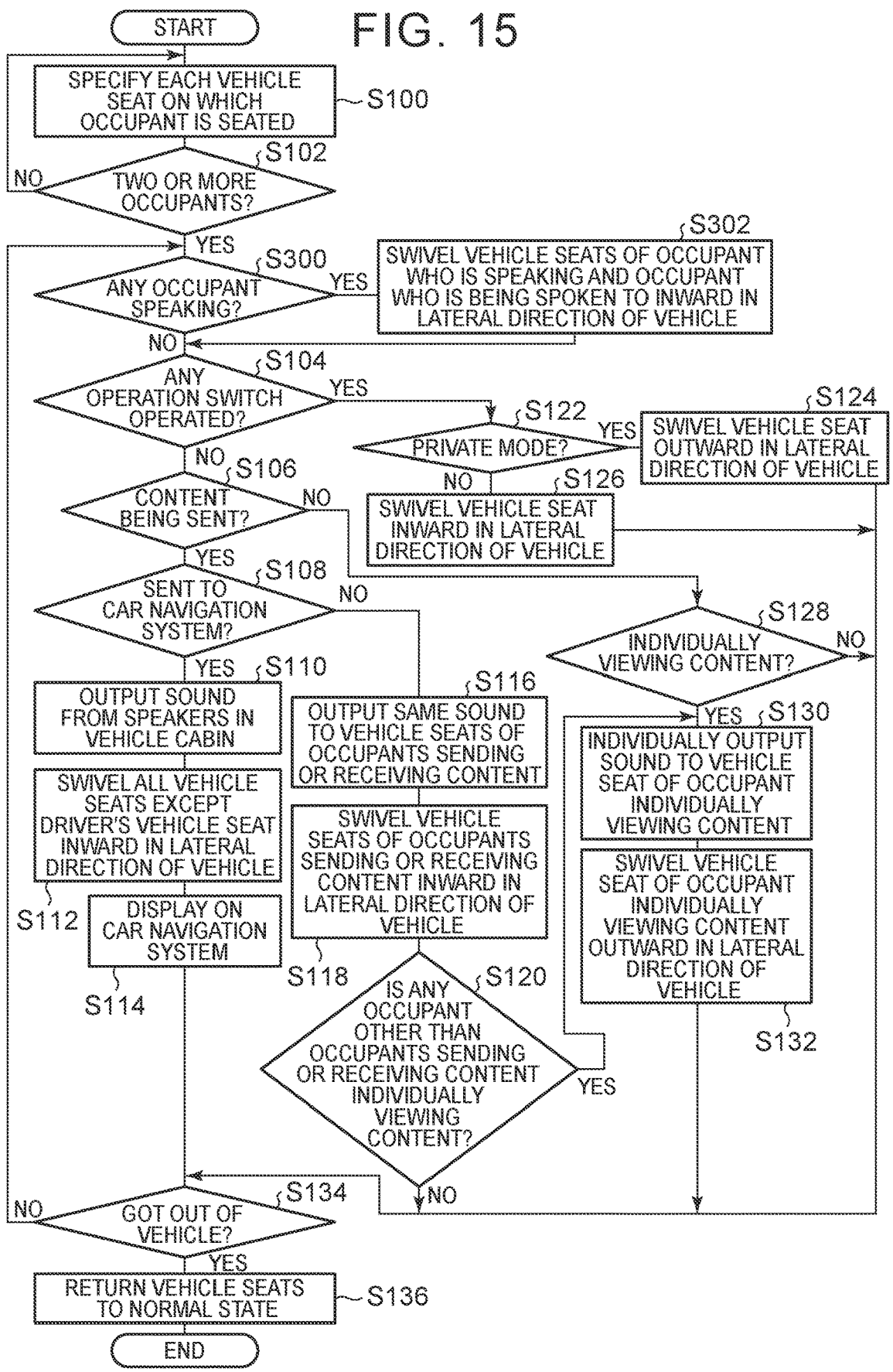
FIG. 15 is a flowchart illustrating the flow of operation of the vehicle cabin control device according to the third embodiment.

As shown in FIG. 14, the vehicle cabin control device 70 includes the ECU 12, the vehicle air conditioning unit 14, the vehicle audio system 16, the car navigation system 18, the seat position sensors 20, the vehicle seat operation devices 22, the operation switches 24, the communication module 26, and a microphone 74.

For example, although not shown in the figure, a plurality of microphones 74 are mounted on the ceiling portion of the vehicle cabin 30. The microphones 74 are connected to the ECU 12 so that the microphones 74 and the ECU 12 can communicate with each other. The microphones 74 detect voice etc. when any of the occupants P speaks and output speech signals to the ECU 12.

Functional Configurations

FIG. 3 is a block diagram showing functional configurations of the vehicle cabin control device 70. The vehicle cabin control device 70 includes as the functional configurations a detection unit 76 that is the detection unit, the determination unit 72, and the output unit 48. The functional configurations are implemented by the CPU 12A of the ECU 12 reading and executing the vehicle cabin control program stored in the ROM 12B or the storage 12D (see FIG. 2).

The detection unit 76 detects the state or each occupant P riding in the vehicle 28. That is, the detection unit 76 detects on which vehicle seat 32 each occupant P is seated based on the position and operating state of each mobile device 42, and detects via the microphones 74 whether at least one occupant P is speaking. When at least one occupant P is speaking, the detection unit 76 also detects the direction of the sound source.

The determination unit 72 determines whether the state in which the occupants P can easily communicate with each other, namely the sharing state, is desirable, based on the state of the mobile device 42 of each occupant P sitting on the vehicle seat 32 and the state of speech of the occupants P as detected by the detection unit 76. Specifically the determination unit 72 determines whether any content is being sent between any of the mobile devices 42 of the occupants P. When the determination unit 72 determines that content is being sent between the mobile devices 42 of the occupants P, the determination unit 72 presumes that "the occupants P will communicate with each other about the content" and determines that the sharing state is desirable. When the determination unit 72 determines that no content is being sent between any of the mobile devices 42 of the occupants P, the determination unit 72 presumes that "the occupants P want to have private time" and determines that the sharing state is not desirable.

When substantially the same information is being displayed on the mobile devices 42 of any of the occupants P the determination unit 72 also presumes that "the occupants P will communicate with each other about the displayed information" and determines that the sharing state is desirable.

When any of the occupants P is speaking, the determination unit 72 estimates the position of the occupant P who is speaking and any other occupants P (the occupants P being spoken to) in accordance with the differences in level and time between the speech signals of the microphones 74, and presumes that "the occupants P communicate with each other in response to the speech of the occupant P" and determines that the sharing state is desirable.

When different information or content is being displayed on the mobile devices 42 of any of the occupants F, the determination unit 72 presumes that "the occupants P want to have private time" and determines that the sharing state is not desirable.

The determination unit 72 determines for which occupants P, namely for which vehicle seats 32 in the vehicle cabin 30, the sharing state is desirable based on the occupants P sending or receiving content or the position information of the occupant P who is speaking. Similarly, the determination unit 72 determines for which occupant(s) P, namely for which vehicle seat(s) 32 in the vehicle cabin 30, the sharing state is not desirable based on the occupants P sending or receiving content or the position information of the occupant P who is speaking. That is, the determination unit 72 determines whether the sharing state is desirable for specific ones of the occupants P and whether the sharing state is not desirable for other specific ones of the occupants P.

The determination unit 72 also determines whether the sharing state is desirable when any of the operation switches 24 is operated. For example, when any of the operation switches 24 is operated to the private mode, the determination unit 72 determines that the sharing state is not desirable for the occupant P sitting on the vehicle seat 32 with the operated operation switch 24. When any of the operation switches 24 is operated to the side different from the private mode, the determination unit 72 determines that the sharing state is desirable for the occupant P sitting on the vehicle seat 32 with the operated operation switch 24.

Processing Flow

Next, functions of the vehicle cabin control device 70 be described. FIG. 15 is a flowchart illustrating the flow of operation of the vehicle cabin control device 70. The CPU 12A reads the vehicle cabin control program from the ROM 12B or the storage 12D and loads and executes the vehicle cabin control program in the RAM 12C to perform processing based on the vehicle cabin control program. The same steps as those of the first embodiment are denoted with the same reference characters and description thereof will be omitted.

After step S102, the CPU 12A determines whether any of the occupants P is speaking (step S300). When none of the occupants P are speaking (step S300: NO), the CPU 12A performs step S104. When any of the occupants P is speaking (step S300: YES), the CPU 12A operates the vehicle seat operation devices 22 to swivel the vehicle seats 32 on which the occupant P who is speaking and the occupant(s) P who is being spoken to are seated inward in the lateral direction of the vehicle (inward in the vehicle cabin 30) from the normal state (step S302). The routine then proceeds to step S104.

Functions and Effects of Third Embodiment

Functions and effects of the third embodiment will be described below.

With the above configuration the vehicle cabin control device 70 is configured in a manner similar to that of the vehicle cabin control device 10 of the first embodiment except that the determination unit 72 determines whether the sharing state is desirable based on the speech of the occupants P. The vehicle cabin control device 70 therefore has effects similar to those of the first embodiment. The determination unit 72 determines that the sharing state is desirable when the detection unit 76 detects that at least one of the occupants P detected by the detection unit 76 is speaking. Based on this determination the output unit 48 operates the vehicle seat operation devices 22 so that the bodies of the occupants P face inward in the lateral direction of the vehicle (inward in the vehicle cabin 30). This facilitates conversation between the occupants P and thus facilitate more active communication between the occupants P. The occupants P thus feel more comfortable in situations where the occupants P want to communicate with each other.

The determination unit 72 is configured to determine whether the sharing state is desirable according to the detection results of the state of the mobile devices 42 of the occupants P and the operating states of the operation switches 24. However, the disclosure is not limited to this configuration. The determination unit 72 may determine whether the sharing state is desirable based only on the determination result of whether any of the occupants P is speaking.

The output unit 48 is configured to operate the vehicle seat operation devices 22. However, the disclosure is not limited to this configuration. The output unit 48 may be configured to operate the vehicle seat operation devices 62 disclosed in the second embodiment.

Fourth Embodiment

A vehicle cabin control device according to a fourth embodiment of the disclosure will be described with reference to FIGS. 3, 16, and 17. The same constituent portions as those of the first embodiment etc. described above are denoted with the same reference character and description thereof will be omitted.

The basic configuration of a vehicle cabin control device 80 according to the fourth embodiment is similar to that of the first embodiment. A feature of the vehicle cabin control device 80 is that a determination unit 82, which is the determination unit, determines whether the sharing state is desirable based on the estimation results of emotions of the occupants P by a determination unit 82.

Hardware Configuration

Figure 16:
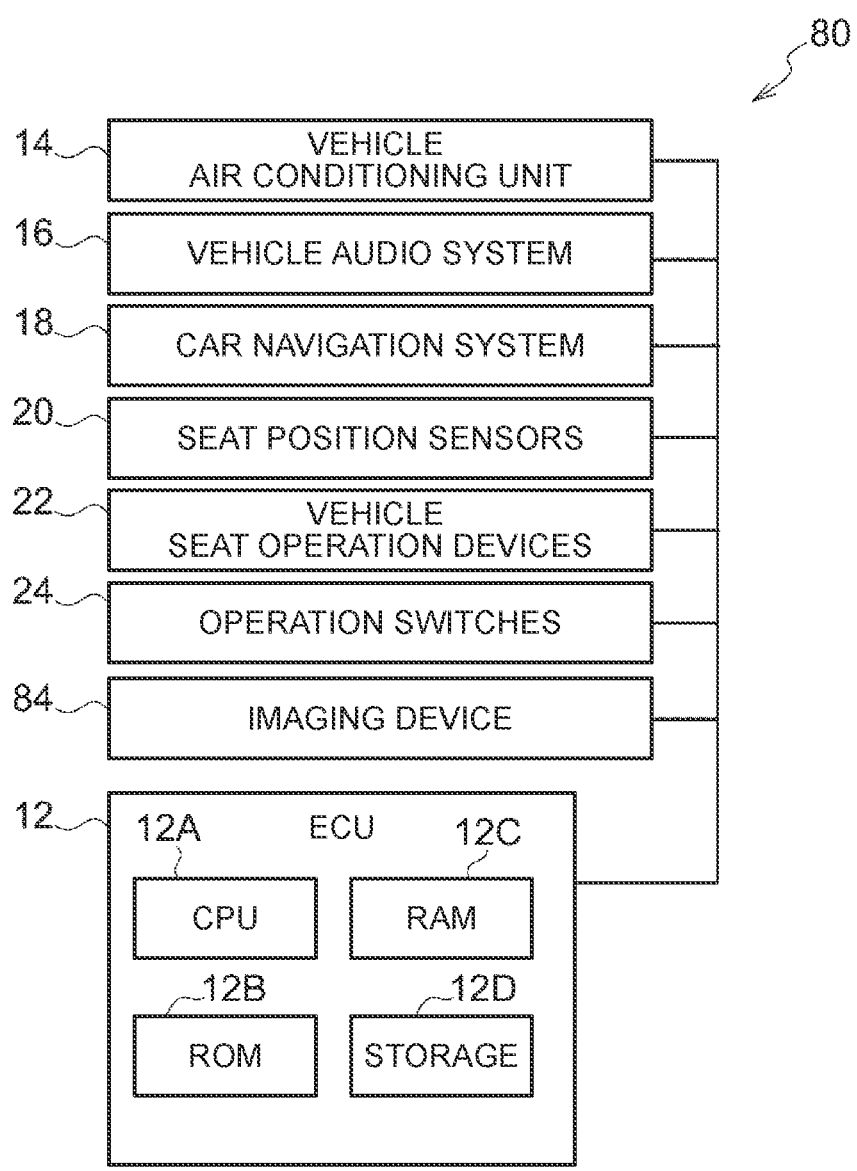
FIG. 16 is a block diagram illustrating a hardware configuration of a vehicle cabin control device according to a fourth embodiment.
Figure 17:
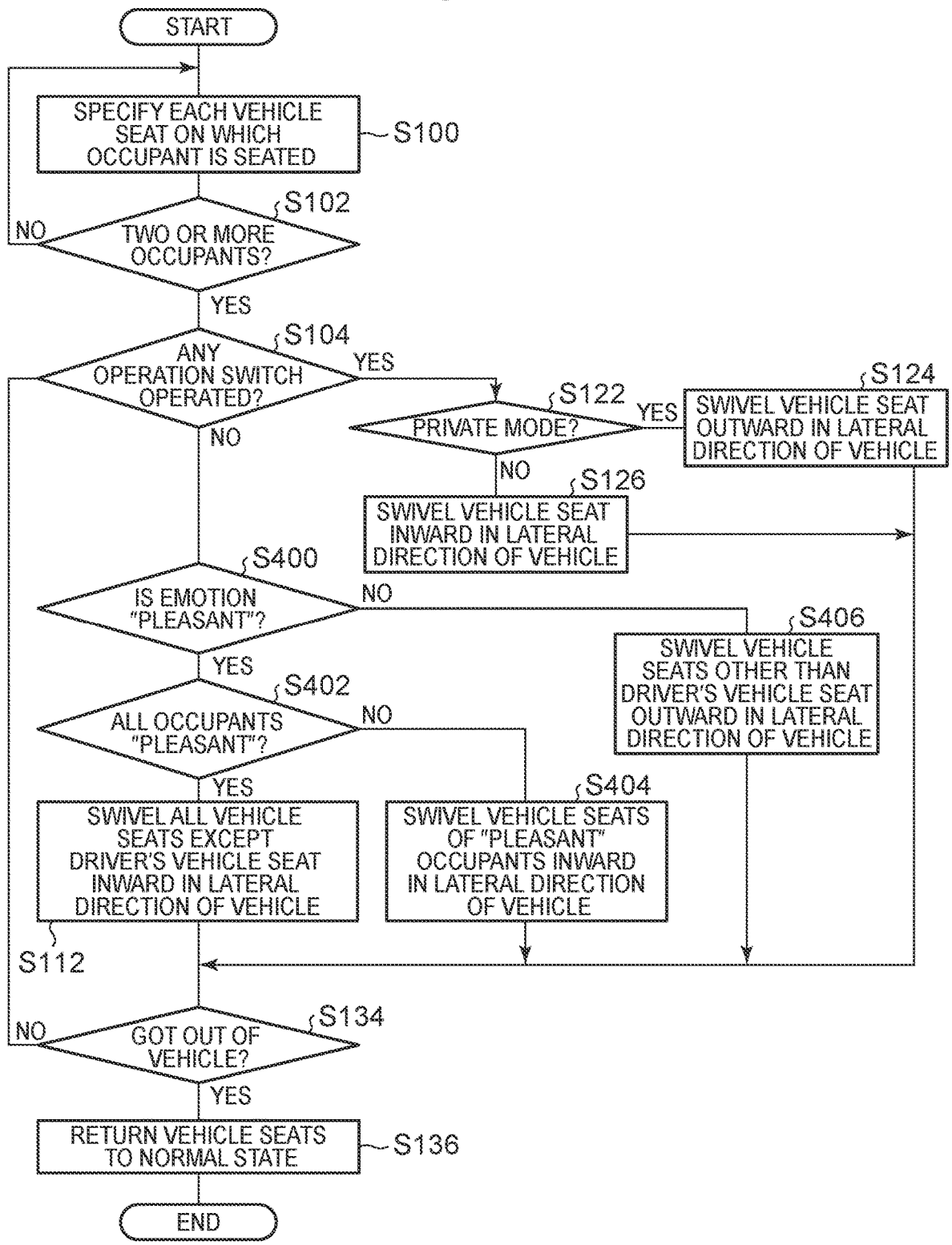
FIG. 17 is a flowchart illustrating the flow of operation of the vehicle cabin control device according to the fourth embodiment.

As shown in FIG. 16, the vehicle cabin control device 80 includes the ECU 12, the vehicle air conditioning unit 14, the vehicle audio system 16, the car navigation system 18, the seat position sensors 20, the vehicle seat operation devices 22, the operation switches 24, and an imaging device 84.

Although not shown in the figure, the imaging device 84 is mounted in, e.g., the vehicle cabin 30. The imaging device 84 is connected to the ECU 12 so that the imaging device 84 and the ECU 12 can communicate with each other. The imaging device 84 includes an imaging element such as a charge-coupled device (CCD) image sensor or a complementary metal-oxide-semiconductor (CMOS) image sensor. The imaging device 84 outputs image data indicating images obtained by imaging element to the ECU 12.

Functional Configurations

FIG. 3 is a block diagram showing functional configurations of the vehicle cabin control device 80. The vehicle cabin control device 80 includes as the functional configurations a detection unit 86 that is the detection unit, the determination unit 82, and the output unit 48. The functional configurations are implemented by the CPU 12A of the ECU 12 reading and executing the vehicle cabin control program stored in the ROM 12B or the storage 12D (see FIG. 2).

The detection unit 86 detects the state of at least one occupant P riding in the vehicle 28. That is, the detection unit 86 analyzes images shown by image data received from the imaging device 84 to detect the facial expression of the detected occupant P and on which vehicle seat 32 the detected occupant P is seated.

The determination unit 82 determines whether the sharing state is desirable based on the facial expression of the at least one occupant P sitting on the vehicle seat 12 detected by the detection unit 86. Specifically, the determination unit 82 determines whether the facial expression of any of the occupants P is a smile. When the facial expression of any of the occupants P is a smile, the determination unit 82 presumes that it means "pleasant" indicating a pleasant emotion. When the emotion of any of the occupants P is "pleasant" and there is any other occupant P whose emotion is also "pleasant," the determination unit 82 determines that the sharing state is desirable for these occupants P. When the facial expression of the at least one occupant P is not a smile, the determination unit 82 presumes that it means "not pleasant" indicating emotions other than the pleasant emotion. When the emotion of the at least one occupant P is "not pleasant," the determination unit 82 determines that the sharing state is not desirable.

Processing Flow

Next, functions of the vehicle cabin control device 80 will be described. FIG. 17 is a flowchart illustrating the flow of operation of the vehicle cabin control device 80. The CPU 12A reads the vehicle cabin control program from the ROM 12B or the storage 12D and loads and executes the vehicle cabin control program in the RAM 12C to perform processing based on the vehicle cabin control program. The same steps as those of the first embodiment are denoted with the same reference characters and description thereof will be omitted.

After step S104, the CPU 12A determines whether the emotion of any of the occupants P is "pleasant" (step S400). When none of the occupants P have a "pleasant" emotion (step S400: NO), the CPU 12A operates the vehicle seat operation devices 22 to swivel the vehicle seats 32 other than the driver's vehicle seat 32 outward in the lateral direction of the vehicle (outward in the vehicle cabin 30) from the normal state (step S406). The routine then proceeds to step S134.

When the emotion of any of the occupants P is "pleasant" (step S400: YES), the CPU 12A determines whether the emotions of all the occupants P are "pleasant" (step S402). When all the occupants P have a "pleasant" emotion (step S402: YES), the CPU 12A performs step S112, and the routine then proceeds to step S134.

When not all of the occupants P have a "pleasant" emotion (step S402: NO), the CPU 12A operates the vehicle seat operation device 22 to swivel the vehicle seat 32 on which each occupant P with a "pleasant" emotion is seated inward in the lateral direction of the vehicle (inward in the vehicle cabin 30) from the normal state (step S404). The routine then proceeds to step S134.

Functions and Effects of Fourth Embodiment

Next, functions and effects of the fourth embodiment will be described.

With the above configuration, the vehicle cabin control device 80 is configured in a manner similar to that of the vehicle cabin control device 10 of the first embodiment except that the determination unit 82 estimates the emotions of the occupants P and determines whether the sharing state is desirable based on the estimation results. The vehicle cabin control device 80 therefore has effects similar to those of the first embodiment. The determination unit 82 estimates the emotions of the occupants P detected from the facial expressions of the occupants P detected by the detection unit 86. The determination unit 82 determines that the sharing state is desirable when the emotions of the occupants P are a specific emotion. This facilitates smooth communication between the occupants P based on their emotions. The occupants P thus feel more comfortable in the vehicle cabin 30.

In the present embodiment, the determination unit 82 estimates the emotion of the occupant P based on his or her facial expression. However, the disclosure is not limited to this. The determination unit 82 may estimate the emotion of the occupant P based on his or her action, the way he or she speak, etc.

In the present embodiment, the determination unit 82 is configured to determine that the sharing state is desirable when the emotions of the occupants P are "pleasant" and determines that the sharing state is not desirable when the emotions of the occupants P are other than "pleasant." However, the disclosure is not limited to this configuration. The determination unit 82 may be configured to determine that the sharing state is desirable based on other emotions of the occupants P.

In the present embodiment, the determination unit 82 is configured to determine whether the sharing state is desirable based on the emotions of the occupants P. However, the disclosure is not limited to this configuration. The determination unit 82 may be configured to determine whether the sharing state is desirable based also on the operating states of the mobile devices 42 and the state of speech of the occupants P.

The output unit 48 is configured to operate the vehicle seat operation devices 22. However, the disclosure is not limited to this configuration. The output unit 48 may be configured to operate the vehicle seat operation devices 62 disclosed in the second embodiment.

The determination unit 82 is configured to determine whether the sharing state is desirable based also on the operating states of the operation switches 24. However, the disclosure is not limited to this configuration. The determination unit 82 may be configured to determine whether the sharing state is desirable based only on the determination results of whether the level of alertness of each occupant P is a specific level.

Fifth Embodiment

Figure 18:
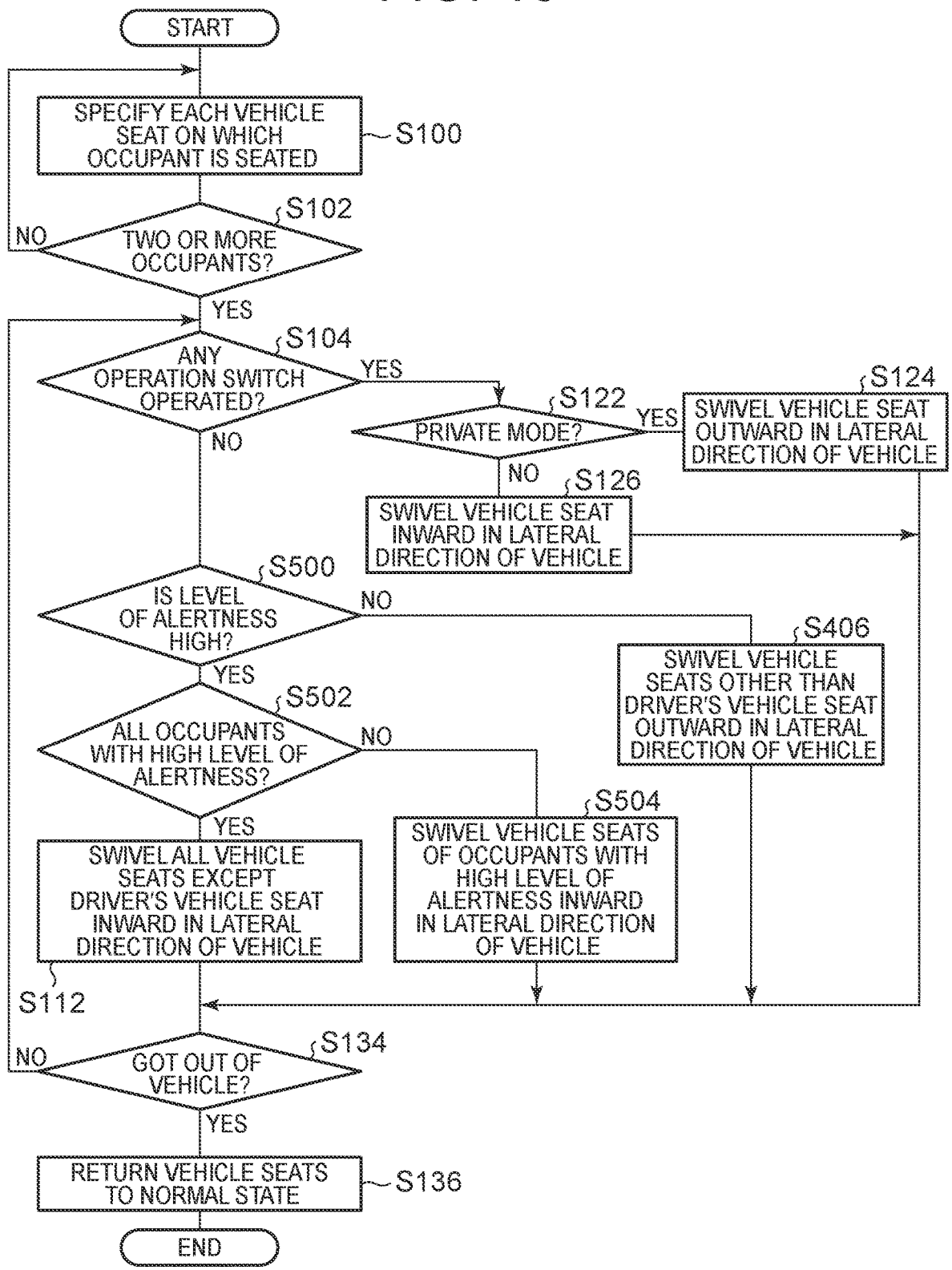
FIG. 18 is a flowchart illustrating the flow of operation of a vehicle cabin control device according to a fifth embodiment.

A vehicle cabin control device 90 according to a fifth embodiment of the disclosure will be described with reference to FIGS. 3 and 18. The same constituent portions as those of the first and fourth embodiments described above are denoted with the same reference characters and description thereof will be omitted.

The basic configuration of the vehicle cabin control device 90 according to the fifth embodiment is similar to that of the first embodiment. A feature of the vehicle cabin control device 90 is that a determination unit 92, which is the determination unit, estimates the levels of alertness of the occupants P and determines whether the sharing state is desirable based on, the estimation results.

Functional Configurations

FIG. 3 is a block diagram showing functional configurations of the vehicle cabin control device 90. The vehicle cabin control device 90 includes as the functional configurations the detection unit 86, the determination unit 92, and the output unit 48. The functional configurations are implemented by the CPU 12A of the ECU 12 reading and executing the vehicle cabin control program stored in the ROM 12B or the storage 12D (see FIG. 2).

The determination unit 92 determines whether the sharing state is desirable based on information on the face of at least one occupant P sitting on the vehicle seat 32 detected by the detection unit 86. Specifically, the determination unit 92 determines from the facial expression of the occupant P whether the level of alertness of the occupant P is high (awake) or low (sleepy or asleep). When the level of alertness of the occupant P is high, the determination unit 92 determines whether there is any other occupant P whose level of alertness is also high. When there is any other occupant P whose level of alertness is also high, the determination unit 92 determines that the sharing state is desirable for these occupants P. When the level of alertness of the at least one occupant P is not high, namely when the level of alertness of the at least one occupant P is low, the determination unit 92 determines that the sharing state is not desirable.

Processing Flow

Next, functions of the vehicle cabin control device 90 will be described. FIG. 18 is a flowchart illustrating the flow of operation of the vehicle cabin control device 90. The CPU 12A reads the vehicle cabin control program from the ROM 12B or the storage 12D and loads and executes the vehicle cabin control program in the RAM 12C to perform processing based on the vehicle cabin control program. The same steps as those of the first embodiment and the fourth embodiment are denoted with the same reference characters and description thereof will be omitted.

When none of the operation switches 24 have been operated in step S104 (step S104: NO), the CPU 12A determines whether the level of alertness of any of the occupants P is high (step S500). When none of the occupants P have a high level of alertness (step S500 NO), the CPU 12A performs step S406. The routine then proceeds to step S134.

When the level of alertness of any of the occupants P is high (step S500: YES), the CPU 12A determines whether the levels of alertness of all the occupants P are high (step S502). When an the occupants P have a high level of alertness (step S502: YES), the CPU 12A performs step S112. The routine then proceeds to step S134.

When not all of the occupants P have a high level of alertness (step S502: NO), the CPU 12A operates the vehicle seat operation device 22 to swivel the vehicle seat 32 on which each occupant P with a high level of alertness is seated inward in the lateral direction of the vehicle (inward in the vehicle cabin 30) from the normal state (step S504). The routine then proceeds to step S134.

Functions and Effects of Fifth Embodiment

Next, functions and effects of the fifth embodiment will be described.

With the above configuration, the vehicle cabin control device 90 is configured in a manner that of the vehicle cabin control device 10 of the first embodiment except that the determination unit 92 estimates the levels of alertness of the occupants P and determines whether the sharing state is desirable based on the estimation results. The vehicle cabin control device 90 therefore has effects similar to those of the first embodiment. The determination unit 92 estimates the levels of alertness of the occupants P detected from the facial expressions of the occupants P detected by the detection unit 86. The determination unit 92 determines that the sharing state is desirable when the levels of alertness of the occupants P are a specific level. The occupants P with similar levels of alertness can thus communicate with each other. The occupants P thus feel more comfortable in the vehicle cabin 30.

Any occupant P with a low level of alertness will not be bothered by the other occupants P because the vehicle seat 32 on which he or she is seated is swiveled outward in the lateral direction of the vehicle (outward in the vehicle cabin 30) from the normal state. The occupant P with a low level of alertness can thus rest without caring about the other occupants P.

In the present embodiment, the determination unit 92 determines the level of alertness of the occupant P based on his or her facial expression. However, the determination unit 92 may estimate the level of alertness of the occupants P based on his or her actions, the way he or she speaks, etc.

The determination unit 92 is configured to determine whether the sharing state is desirable based on the levels of alertness of the occupants P. However, the disclosure is not limited to this configuration. The determination unit 92 may be configured to determine whether the sharing state is desirable based also on the emotions of the occupants P or may be configured to determine whether the sharing state is desirable based also on the operating states of the mobile devices 42 and the state of speech of the occupants P.

The output unit 48 is configured to operate the vehicle seat operation devices 22. However, the disclosure is not limited to this configuration. The output unit 48 may be configured to operate the vehicle seat operation devices 62 disclosed in the second embodiment.

The determination unit 92 is configured to determine whether the sharing state is desirable based also on they operating states of the operation switches 24. However, the disclosure is not limited to this configuration. The determination unit 92 may be configured to determine whether the sharing state is desirable based only on the determination results of whether the emotion of each occupant P is a specific emotion.

The first to fifth embodiments are configured so that the orientation of the body of the occupant P (driver) sitting on the drivers vehicle seat 32, 64 is not changed. However, the disclosure is not limited to this configuration, in a vehicle that runs autonomously, the driver's vehicle seat 32, 64 may also be swiveled or the shape of the seating surface of the driver's vehicle seat 32, 64 may also be changed during autonomous driving.

The output unit 48, 66 is configured to operate the vehicle seat operation devices 22, 62 according to the determination results of the determination unit 46, 72, 82, 92. However, the disclosure is not limited to this configuration. For example, the output unit 48, 66 may be configured to operate only one vehicle seat operation device 22 or 62 as in in the case where the occupants P are seated only on the driver's vehicle seat 32, 64 and the passenger's vehicle seat 32, 64 or in the case of a two-seater vehicle etc.

In the sharing state as shown in FIG. 7, the sound corresponding to content is output from the directional speaker 40 to each occupant P viewing the content. However, the disclosure is not limited to this configuration. Conversation between the occupants P in the sharing state may be collected by the microphones 74 and output from the directional speakers 40 to these occupants P in order to facilitate conversation.

In the above embodiments, substantially the same information as that displayed on the mobile devices 42 sharing the information is displayed on the car navigation system 18. However, the disclosure is not limited to this configuration. Information different from the information or content displayed on the mobile devices 42 may be displayed on the car navigation system 18.

The operation switches 24 are provided on the vehicle seats 32, 64. However, the disclosure is not limited to this configuration. The operation switches 24 may be provided on a door trim or at other positions.

The vehicle seat operation devices 22, 62 are configured to change the orientation of the seating surfaces of both the seat cushion 32A and the seatback 32B of the vehicle seat 32, 64. However, the disclosure is not limited to this configuration. The vehicle seat operation devices 22, 62 may be configured to change the orientation of only the seating surface of the seat cushion 32A or to change the orientation of only the seating surface of the seatback 32B.

The vehicle air conditioning unit 14 is mounted in front of and below the instrumental panel (see FIG. 1). However, the disclosure is not limited to this configuration. The vehicle air conditioning unit 14 may be individually mounted on each vehicle seat 32, 64.

It is to be understood that the disclosure is not limited to the above examples and the disclosure can be carried out in various modified forms other than the above examples without departing from the spirit and scope of the disclosure.

What is claimed is:

1. A vehicle cabin control device, comprising:
   a plurality of seating surface changing devices configured to change orientations of seating surfaces of a plurality of vehicle seats mounted in a vehicle cabin, the seating surface changing devices include a swivel mechanism configured to swivel the vehicle seat about a vertical direction of a vehicle;
   a detection unit configured to detect states of a plurality of occupants sitting on the vehicle seats;

a determination unit configured to determine whether a sharing state is desirable based on a detection result of the detection unit, the sharing state being a state in which the occupants easily communicate with each other; and an output unit configured to
when the determination unit determines that the sharing state is desirable, operate the swivel mechanism corresponding to the vehicle seats where first occupants are seated so as to swivel the vehicle seats where first occupants are seated inward in a vehicle lateral direction by at least 20 degrees to change orientations of bodies of the first occupants to such orientations that the first occupants easily communicate with each other, the first occupants being occupants for whom the sharing state is desirable, and when the determination unit determines that the sharing state is not desirable, operate the swivel mechanism corresponding to the vehicle seat where a second occupant is seated so as to swivel vehicle seat where the second occupant is seated outward in the vehicle lateral direction by at least 20 degrees to change an orientation of the body of the second occupant to such an orientation that the second occupant does not easily communicate with the other occupants, the second occupant being an occupant for whom the sharing state is not desirable, wherein the seating surface changing devices includes a pair of slide pieces that are slidably attached to a pair of slide rail units to slidable attach the plurality of vehicle seats to a floor of the vehicle cabin, the pair of slide pieces and the pair of slide rail units configured to move the plurality of vehicle seats about a vehicle longitudinal direction, and wherein the output unit is configured to
when the determination unit determines that the sharing state is not desirable, operate the seating surface changing devices corresponding to the vehicle seat where the second occupant is seated to slide the vehicle seat where the second occupant is seated in the vehicle longitudinal direction to change a position of the body of the second occupant to such a position that the second occupant does not easily communicate with the other occupants.

2. The vehicle cabin control device according to claim 1, wherein each of the seating surface changing devices includes a variable seating surface mechanism configured to change the shape of the seating surface of the vehicle seat.

3. The vehicle cabin control device according to claim 1, wherein the output unit is configured to operate the seating surface changing devices so that the bodies of all the occupants face inward in the vehicle cabin when the determination unit determines that the sharing state is desirable for all of the occupants.

4. The vehicle cabin control device according to claim 1, wherein the output unit is configured to, when the determination unit determines that the sharing state is desirable for specific occupants among the occupants, operate the seating surface changing devices corresponding to the vehicle seats where the specific occupants are seated so that the bodies of the specific occupants face inward in the vehicle cabin.

5. The vehicle cabin control device according to claim 1, wherein the output unit is configured to operate the seating surface changing devices so that the bodies of all the occupants face outward in the vehicle cabin when the determination unit determines that the sharing state is not desirable for any of the occupants.

6. The vehicle cabin control device according to claim 1, wherein the output unit is configured to, when the determination unit determines that the sharing state is not desirable for a specific occupant among the occupants, operate the seating surface changing device corresponding to the vehicle seat where the specific occupant is seated so that the body of the specific occupant faces outward in the vehicle cabin.

7. The vehicle cabin control device according to claim 1, wherein:
a plurality of switches configured to be operated by the occupants sitting on the vehicle seats are mounted in the vehicle cabin;
the detection unit is configured to detect an operating state of at least one of the switches; and
the determination unit is configured to determine whether the sharing state is desirable according to the detection result of the detection unit.

8. The vehicle cabin control device according to claim 1, wherein:
the detection unit is configured to detect speech of at least one of the occupants; and
the determination unit is configured to determine that the sharing state is desirable when the detection unit detects the speech.

9. The vehicle cabin control device according to claim 1, wherein:
the detection unit is configured to detect states of mobile devices of at least two of the occupants; and
the determination unit is configured to determine that the sharing state is desirable when information is shared between the mobile devices.

10. The vehicle cabin control device according to claim 1, wherein:
at least one display device is mounted in the vehicle cabin; and
the output unit is configured to, when the determination unit determines that the sharing state is desirable, display information on the one display device and operate the seating surface changing devices so that the bodies of the occupants face the display device with information being displayed thereon.

11. The vehicle cabin control device according to claim 1, wherein:
the detection unit is configured to detect states of mobile devices of at least two of the occupants;
the determination unit is configured to determine that the sharing state is desirable when information is shared between the mobile devices;
at least one display device is mounted in the vehicle cabin; and
the output unit is configured to
when the determination unit determines that the sharing state is desirable, display information on the one display device and operate the seating surface changing devices so that the bodies of the occupants face the display device on which information is displayed, and
when the determination unit determines that information is shared between the mobile devices, display on the display device substantially the same information as the information displayed on the mobile devices sharing the information.

12. The vehicle cabin control device according to claim 1, wherein:
- the detection unit is configured to detect states of mobile devices of at least two of the occupants;
- the determination unit is configured to determine whether information is shared between the mobile devices;
- at least one display device is mounted in the vehicle cabin; and
- the output unit is configured to, when the determination unit determines that information is shared between the mobile devices, display on the display device the same information as the information displayed on the mobile devices sharing the information.

13. The vehicle cabin control device according to claim 1, wherein:
- the detection unit is configured to detect facial expressions of the occupants; and
- the determination unit is configured to
  - estimate emotions of the occupants detected based on the detection result of the detection unit and
  - determine that the sharing state is desirable when the emotions are a specific emotion.

14. The vehicle cabin control device according to claim 1, wherein:
- the detection unit is configured to detect facial expressions of the occupants; and
- the determination unit is configured to
  - estimate levels of alertness of the occupants detected based on the detection result of the detection unit and
  - determine that the sharing state is desirable when the levels of alertness are a specific level of alertness.

15. The vehicle cabin control device according to claim 1, wherein:
- the vehicle seats are equipped with directional speakers and
- the directional speakers are configured to
  - when the determination unit determines that the sharing state is desirable, output same information from the directional speakers of the vehicle seats for which the determination unit determines that the sharing state is desirable, and
  - when the determination unit determines that the sharing state is not desirable, output individual information from the directional speakers of the vehicle seats for which the determination unit determines that the sharing state is not desirable.

* * * * *